United States Patent
Manaka et al.

(10) Patent No.: US 8,319,468 B2
(45) Date of Patent: Nov. 27, 2012

(54) STEPPING MOTOR CONTROL CIRCUIT AND ANALOGUE ELECTRONIC TIMEPIECE

(75) Inventors: Saburo Manaka, Chiba (JP); Takanori Hasegawa, Chiba (JP); Keishi Honmura, Chiba (JP); Kasuke Yamamoto, Chiba (JP); Kenji Ogasawara, Chiba (JP); Hiroyuki Masaki, Chiba (JP); Akira Takakura, Chiba (JP); Kazuo Kato, Chiba (JP); Kazumi Sakumoto, Chiba (JP)

(73) Assignee: Seiko Instruments Inc. (JP)

( * ) Notice: Subject to any disclaimer, the term of this patent is extended or adjusted under 35 U.S.C. 154(b) by 850 days.

(21) Appl. No.: 12/455,046

(22) Filed: May 28, 2009

(65) Prior Publication Data
US 2010/0172219 A1    Jul. 8, 2010

(30) Foreign Application Priority Data

May 29, 2008 (JP) ................. 2008-141092
Dec. 19, 2008 (JP) ................. 2008-323566
Apr. 1, 2009 (JP) ................. 2009-089566

(51) Int. Cl.
*H02P 8/02* (2006.01)
*G04C 3/14* (2006.01)

(52) U.S. Cl. ............. 318/685; 318/696; 368/76; 368/80
(58) Field of Classification Search ................. 318/685, 318/696; 368/47, 76, 80, 157
See application file for complete search history.

(56) References Cited

U.S. PATENT DOCUMENTS

| | | | | |
|---|---|---|---|---|
| 4,276,626 A | * | 6/1981 | Satoh et al. | 368/80 |
| 4,283,783 A | * | 8/1981 | Nakajima et al. | 368/76 |
| 4,326,278 A | * | 4/1982 | Shida et al. | 368/157 |
| 4,340,946 A | * | 7/1982 | Kanno et al. | 368/76 |
| 4,361,410 A | * | 11/1982 | Nakajima et al. | 368/157 |
| 4,381,481 A | * | 4/1983 | Kuppers et al. | 318/696 |
| 4,688,948 A | * | 8/1987 | Kiyono | 368/157 |
| 5,550,795 A | * | 8/1996 | Takakura et al. | 368/157 |
| 5,933,392 A | * | 8/1999 | Sato et al. | 368/157 |
| 6,349,075 B1 | * | 2/2002 | Miyauchi et al. | 368/230 |
| 6,476,579 B1 | * | 11/2002 | Akahane et al. | 318/696 |
| 6,999,381 B2 | * | 2/2006 | Fujisawa et al. | 368/47 |
| RE40,370 E | * | 6/2008 | Sato et al. | 368/157 |

(Continued)

OTHER PUBLICATIONS

Abstract, publication No. JP 57017884, publication dated, Jan. 29, 1982.
Abstract, publication No. JP 61015385, publication date, Apr. 23, 1986.

(Continued)

*Primary Examiner* — Eduardo Colon Santana
(74) *Attorney, Agent, or Firm* — Adams & Wilks

(57) ABSTRACT

The present invention aims to prevent a main drive pulse from being moved to a rank having a potential to cause a non-rotating state. A detection segment for detecting a rotating state of a stepping motor is divided into a first segment immediately after the drive with a main drive pulse, a second segment, and a third segment and, when the stepping motor is rotated by the main drive pulse, the main drive pulse is not changed when a detection signal exceeding a reference threshold voltage is detected at least in the first and second segments. When it is detected only in the first and third segments, or detected only in the third segment, the rank is moved upward and, when it is not detected in any segment, or detected only in the first segment, the rank is moved upward after the drive with a corrective drive pulse. When it is detected only in the second segment or detected only in the second and third segments, the rank is moved downward.

28 Claims, 15 Drawing Sheets

U.S. PATENT DOCUMENTS

| | | |
|---|---|---|
| 7,977,909 B2 * | 7/2011 | Kasuo et al. ............... 318/696 |
| 2006/0186853 A1 * | 8/2006 | Brummack et al. ......... 318/685 |
| 2008/0089183 A1 | 4/2008 | Manaka et al. ............. 368/202 |
| 2009/0206789 A1 * | 8/2009 | Kasuo et al. ............... 318/696 |
| 2010/0238768 A1 * | 9/2010 | Kato et al. .................. 368/80 |
| 2011/0235472 A1 * | 9/2011 | Hasegawa .................. 368/80 |
| 2011/0249539 A1 * | 10/2011 | Aoki ........................... 368/189 |

OTHER PUBLICATIONS

Abstract, publication No. JP 8033457, publication date, Mar. 29, 1996.

Abstract, publication No. WO 2005119377, publication date, Dec. 15, 2005.

\* cited by examiner

FIG. 4

| DETECTION OF ROTATION | | | | RANK OPERATION | | |
|---|---|---|---|---|---|---|
| T1 | T2 | T3 | DETERMINATION | DECISION | P1 | P2 |
| 0 | 1 | 1/0 | ROTATION WITH RESERVED CAPACITY | DOWN | −1 RANK | NO OPERATION |
| 1 | 1 | 1/0 | ROTATION WITHOUT RESERVED CAPACITY | MAINTAINED | 0 | NO OPERATION |
| 1/0 | 0 | 1 | ROTATION WITH LEAST ENERGY | UP | +1 RANK | NO OPERATION |
| 1/0 | 0 | 0 | NON-ROTATION | P2 + UP | +1 RANK | WITH OPERATION |

FIG. 11

| DETECTION OF ROTATION | | | | | RANK OPERATION | | |
|---|---|---|---|---|---|---|---|
| T1a | T1b | T2 | T3 | DETERMINATION | DECISION | P1 | P2 |
| 1/0 | 0 | 0 | 0 | NON-ROTATION | P2+UP | +1 RANK | WITH OPERATION |
| 1/0 | 0 | 0 | 1 | LARGE LOAD INCREMENT | UP | +1 RANK | NO OPERATION |
| 0 | 0 | 1 | 0 | NORMAL LOAD | DOWN | −1 RANK | NO OPERATION |
| 0 | 0 | 1 | 1 | NORMAL LOAD | DOWN | −1 RANK | NO OPERATION |
| 1/0 | 1 | 0 | 0 | NON-ROTATION | P2+UP | +1 RANK | WITH OPERATION |
| 1/0 | 1 | 0 | 1 | LARGE LOAD INCREMENT | UP | +1 RANK | NO OPERATION |
| 1/0 | 1 | 1 | 0 | LARGE LOAD INCREMENT | UP | +1 RANK | NO OPERATION |
| 1/0 | 1 | 1 | 1 | LARGE LOAD INCREMENT | UP | +1 RANK | NO OPERATION |
| 1 | 0 | 1 | 0 | SMALL LOAD INCREMENT | MAINTAINED | ±0 RANK | NO OPERATION |
| 1 | 0 | 1 | 1 | SMALL LOAD INCREMENT | MAINTAINED | ±0 RANK | NO OPERATION |

STEPPING MOTOR CONTROL CIRCUIT AND ANALOGUE ELECTRONIC TIMEPIECE

BACKGROUND OF THE INVENTION

1. Field of the Invention

The present invention relates to a stepping motor control circuit and an analogue electronic timepiece using the stepping motor control circuit.

2. Description of the Related Art

In the related art, a stepping motor including a stator having a rotor storage hole and a positioning device which determines the stop position of the rotor, a rotor disposed in the rotor storage hole, and a coil, and being configured to rotate the rotor by supplying an alternating signal to the coil to generate a magnetic flux in the stator and stop the rotor at a position corresponding to the positioning device is used in an analogue electronic timepiece or the like.

As a control system of the stepping motor, a correction drive system configured to detect whether the stepping motor is rotated or not when the stepping motor is driven with a main drive pulse, by detecting a detection signal on the basis of an induced voltage generated in the stepping motor and, depending on whether or not the stepping motor is rotated, changing the main drive pulse to a main drive pulse having a different pulse width for driving, or rotating the stepping motor forcedly by a corrective drive pulse having a larger pulse width than the main drive pulse is used (for example, see Patent Document JP-B-61-15385).

According to Patent Document JP-A-57-17884, a drive control of the stepping motor is performed in two segments of the induced voltage, and in one of these two segments (a segment in earlier time), control to move the rank of the pulse downward is performed for a detected voltage according to the two pulse states. In the later segment, determination of the rotation of the rotor is performed.

The pulse-down is performed when the earlier pulse is lower than the detected voltage and the later pulse is higher than the detected voltage. Also, the pulse detection time for the pulse-down control is changed regularly, so that the load variations are detected and sensed at regular intervals.

According to Patent Document WO2005/119377, when detecting the rotation of the stepping motor, a unit for comparing and discriminating a detected time and a reference time in addition to the detection of the detection signal is provided and, if the detection signal is lower than a predetermined reference threshold voltage Vcomp after having rotated the stepping motor with a main drive pulse P11, a corrective drive pulse P2 is outputted and a main drive pulse P1 for the next time is changed to a main drive pulse P12 having a large energy than the main drive pulse P11 for driving. When the detection time when rotating the rotor with the main drive pulse P12 is earlier than the reference time, the main drive pulse P12 is changed to the main drive pulse P11, and the rotation is made with the main drive pulse P1 according to a load during the drive, so that the current consumption is reduced.

However, when the eccentricity of the rotor or the displacement between the center of rotation of the rotor and the center of the stator hole is significant due to the variations in mass production, one of detent torques (torques to maintain the rotor at the initial position) for the rotor polarities corresponding to an first terminal OUT1 and a second terminal OUT2 of a drive coil becomes high and the other one becomes low.

Therefore, the present inventions in the present inventions disclosed in Patent Documents mentioned above have such a problem that the rank of the drive pulse may be moved downward to a drive pulse which causes the non-rotating state, and hence the delay might be resulted when the erroneous determination is occurred, whereby the function as the timepiece is impaired.

More specifically, the induced voltage induced between the detection segments generally tends to cause a delay in time of generation of the detection signal when the reserved drive capacity is reduced. Depending on the variations in parts or the fluctuations in load, even though the reserved drive capacity of one of the polarities is reduced, the output reserved drive capacity remains in the other polarity, which might cause a difficulty in discrimination from the drive with a reserved capacity.

In this case, it is determined to be the drive with a reserved capacity, and the main drive pulse is changed to a main drive pulse having smaller drive energy. However, there might be a case in which the output in one of the polarities has no reserved capacity with this changed main drive pulse, and hence the rotation might be disabled.

Also, in the corrective drive system in the related art, since the drive is performed with the main drive pulse having a minimum energy, there is such a problem that the rotor is brought into the non-rotation state with the minimum drive pulse after having moved downward in rank and, if the erroneous determination in detection of rotation is occurred at this time, the delay is resulted and the function as the timepiece is impaired.

According to the electronic timepiece disclosed in Patent Document JP-B-8-33457, the rotating state is determined by detecting the rotating stat of the stepping motor in a plurality of detection segments (first segment and second segment). The determination of the rotation is achieved by detecting the rotating state by the detection signal generated when being driven with the drive pulse, and the first segment is a segment for detecting the rotating state by the detection signal of one of the polarities, and the second segment is a segment for detecting the rotating state by the detection signal of the other polarity on the basis of the result of determination in the first segment. In this manner, since the detection is made in only one segment with each polarity, there is such a problem that the accuracy of determination is low, and there is a risk of moving the rank of the main drive pulse erroneously downward to a main drive pulse having a potential to cause the non-rotating state. Also, since the detection is made with one drive pulse for each polarity, there is such a problem that the determination of the rotation is complicated, and the scale of the circuit is disadvantageously increased.

SUMMARY OF THE INVENTION

It is an object of the present invention to prevent a main drive pulse from being moved to a rank having a potential to cause a non-rotating state.

According to the present invention, there is provided a stepping motor control circuit including a rotation detecting unit configured to detect a detection signal generated by a rotation of a stepping motor and detect a rotating state of the stepping motor according to whether the detection signal exceeds a predetermined reference threshold voltage within a predetermined detection segment or not; and a control unit configured to control the drive of the stepping motor with one of a plurality of main drive pulses different in energy from each other or a corrective drive pulse having a large energy than the respective main drive pulse according to the result of detection by the rotation detecting unit, in which the detection segment starting immediately after the drive with the main drive pulse is divided into a plurality of, that is, three or more segments, and the control unit controls the main drive pulse according to the segment in which the rotation detecting unit detects the detection signal exceeding the reference threshold voltage.

The detection segment starting immediately after the drive with the main drive pulse into a plurality of, that is, three or more segments, and the control unit controls the main drive pulse according to the segment in which the rotation detecting unit detects the detection signal exceeding the reference threshold voltage.

Here, the detection segment may be divided into a first segment immediately after the drive with the main drive pulse, a second segment after the first segment, and a third segment after the second segment.

The detection segment may be divided into the first segment immediately after the drive with the main drive pulse, the second segment after the first segment, the third segment after the second segment, and a fourth segment after the third segment.

According to the present invention, there is provided an analogue electronic timepiece having a stepping motor configured to rotate time hands, and a stepping motor control circuit configured to control the stepping motor, characterized in that any one of the above-described stepping motor control circuits as the stepping motor control circuit.

According to the motor control circuit in the present invention, prevention of the main drive pulse from being moved to a rank having a potential to cause a non-rotating state is achieved.

According to an analogue electronic circuit in the present invention, prevention of the main drive pulse from being moved to a rank having a potential to cause the non-rotating state is achieved, so that the accurate clocking action is achieved.

BRIEF DESCRIPTION OF THE DRAWINGS

FIG. 4 is a determination chart for explaining the action of the stepping motor control circuit and the analogue electronic timepiece according to the embodiment of the present invention;

FIG. 11 is a determination chart for explaining the action of the stepping motor control circuit and the analogue electronic timepiece according to still another embodiment of the present invention;

DESCRIPTION OF THE PREFERRED EMBODIMENT

Figure 1:
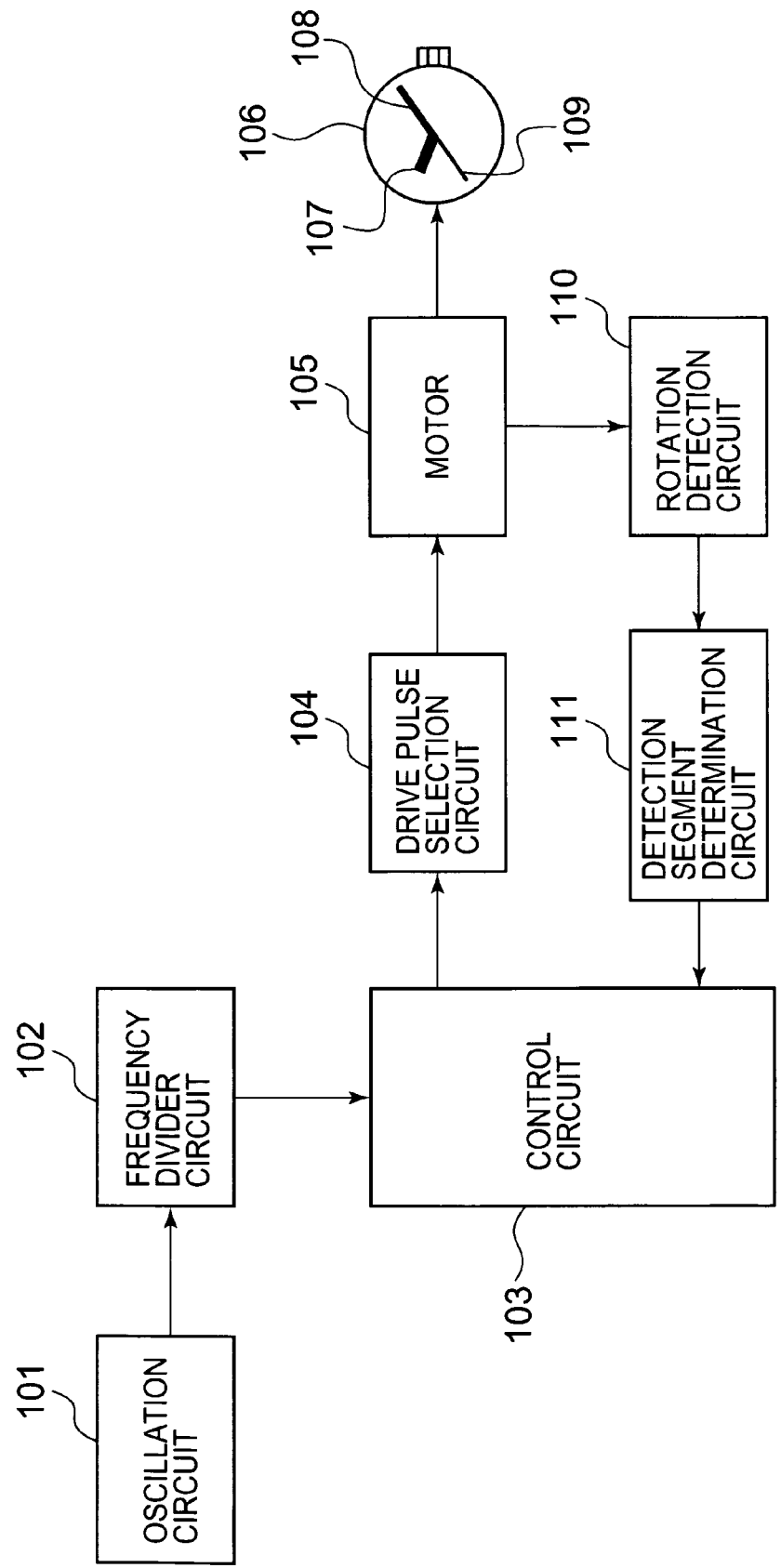
FIG. 1 is a block diagram of an analogue electronic timepiece according to an embodiment of the present invention.

FIG. 1 is a block diagram showing an analogue electronic timepiece using a stepping motor control circuit according to an embodiment of the present invention, which is a common block diagram for respective embodiments described later showing an example of an analogue electronic wrist timepiece.

In FIG. 1, the analogue electronic timepiece includes an oscillation circuit 101 configured to generate a signal having a predetermined frequency, a frequency divider circuit 102 configured to divide the signal generated in the oscillation circuit 101 and generates a clock signal which is a reference of clocking, a control circuit 103 configured to perform controls such as control of respective electronic circuit elements which constitute an electronic timepiece or control to change a drive pulse, a drive pulse selection circuit 104 configured to select and output the drive pulse for rotating the motor on the basis of a control signal from the control circuit 103, a stepping motor 105 configured to be rotated by the drive pulse from the drive pulse selection circuit 104, an analogue display unit 106 having time hands (in the example shown in FIG. 1, three types of hands such as a hour hand 107, a minute hand 108, and a second hand 109) rotated by the stepping motor 105 for displaying the time, a rotation detection circuit 110 configured to detect a detection signal (also referred to as an induced signal) VRs indicating the rotating state from the stepping motor 105 in a predetermined detection segment, and a detection segment determination circuit 111 configured to determine which segment the detection signal VRs is detected from by comparing the time when the rotation detection circuit 110 detects the detection signal VRs which exceeds a predetermined reference threshold voltage Vcomp and the detected segment. As described later, in this embodiment, the detection segment for detecting the rotating state of the stepping motor 105 is divided into three segments.

The rotation detection circuit 110 has the similar configuration as the rotation detecting circuit described in Patent Document 1, and the reference threshold voltage Vcomp is set to such a value that the rotation detection circuit 110 detects the detection signal VRs which exceeds the predetermined reference threshold voltage Vcomp when a rotor makes a constantly fast action as in the case in which the stepping motor 105 is rotated, and the detection signal VRs does not exceed the reference threshold voltage Vcomp when the rotor does not make the constantly fast action as in the case in which the stepping motor 105 is not rotated.

The oscillation circuit 101 and the frequency divider circuit 102 constitute a signal generating unit, and the analogue display unit 106 constitutes a time display unit. The rotation detection circuit 110 constitutes a rotation detecting unit, and the control circuit 103, the drive pulse selection circuit 104, the rotation detection circuit 110, and the detection segment determination circuit 111 constitute a control unit.

Figure 2:
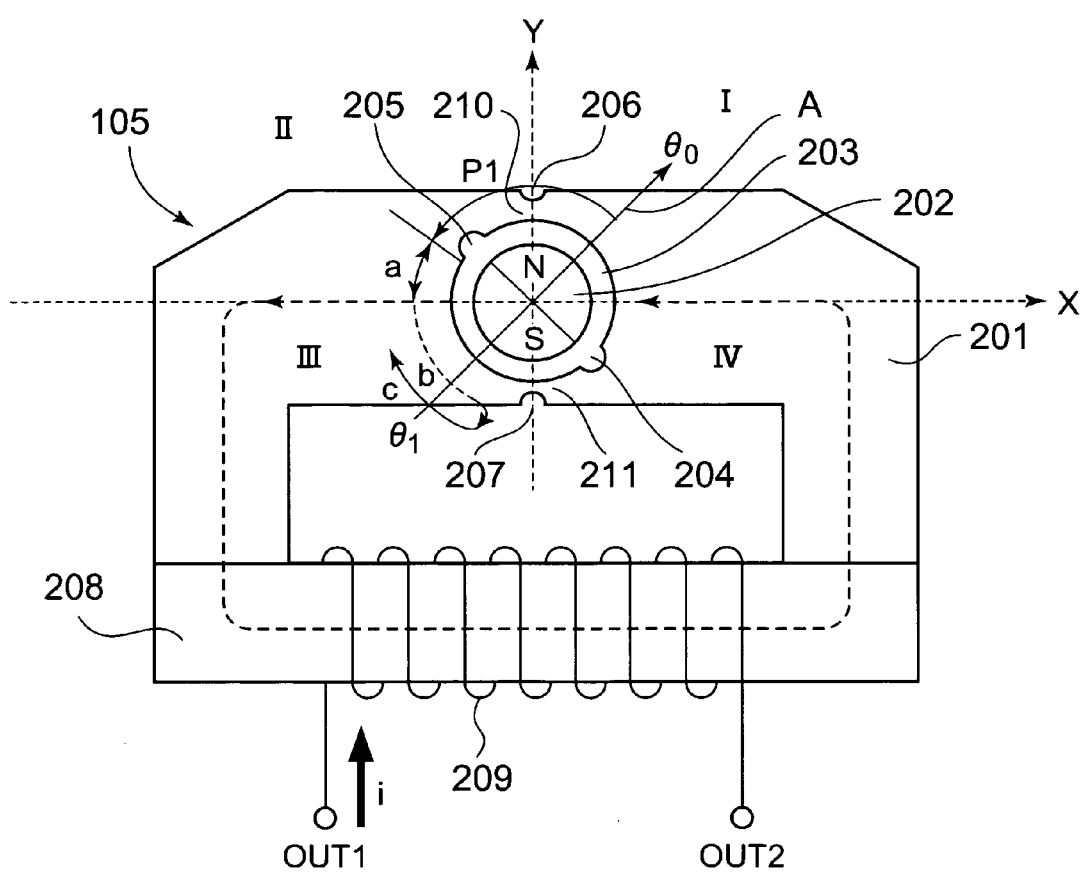
FIG. 2 is a configuration drawing showing a stepping motor used in the analogue electronic timepiece according to the embodiment of the present invention.

FIG. 2 is a configuration drawing showing a stepping motor used in the embodiment of the present invention, and is a configuration drawing of the stepping motor which is common for respective embodiments described later, showing an example of a stepping motor for a timepiece which is generally used in the analogue electronic timepieces.

In FIG. 2, the stepping motor 105 includes a stator 201 having a rotor storage through hole 203, a rotor 202 rotatably disposed at the rotor storage through hole 203, a magnetic core 208 joined with the stator 201, and a coil 209 wound around the magnetic core 208. When the stepping motor 105 is used in the analogue electronic timepiece, the stator 201 and the magnetic core 208 are fixed to a base panel (not shown) by screws (not shown), and are joined to each other. The coil 209 includes a first terminal OUT1 and a second terminal OUT 2.

The rotor 202 is magnetized into two polarities (S-pole and N-pole). A plurality (two in this embodiment) of notched portions (outer notches) 206 and 207 are formed on an outer end portion of the stator 201 formed of a magnetic material at positions opposed with the intermediary of the rotor storage through hole 203. Provided between the respective outer notches 206 and 207 and the rotor storage through hole 203 are saturable portions 210 and 211.

The saturable portions 210 and 211 are configured so as not to be saturated in magnetism by a magnetic flux of the rotor 202, and to be saturated in magnetism when the coil 209 is excited, thereby increasing the magnetic resistance. The rotor storage through hole 203 is configured into a circular hole shape formed integrally with a plurality of semicircular notched portions (inner notches) 204 and 205 in a portion on the opposite side of the through hole having a circular contour.

The notched portions 204 and 205 constitute a positioning device for determining the stop position of the rotor 202. In the state in which the coil 209 is not excited, the rotor 202 is stably stopped at a position corresponding to the positioning device as shown in FIG. 2, in other words, at a position where an axis of magnetic poles A of the rotor 202 intersects a segment connecting the notched portions 204 and 205 orthogonally (at an angle-$\theta 0$ position). An XY coordinate space about an axis of rotation (center of rotation) of the rotor 202 is divided into four quadrants (first quadrant I to fourth quadrant IV).

When a square wave drive pulse having one of the poles is supplied from the drive pulse selection circuit 104 between the terminals OUT1 and OUT 2 of the coil 209 (for example, a positive pole to the first terminal OUT1 and a negative pole to the second terminal OUT2) and a current i is flowed in the direction indicated by an arrow in FIG. 2, the magnetic flux in the direction indicated by an arrow of a broken line is generated in the stator 201. Accordingly, the saturable portions 210 and 211 are saturated and the magnetic resistance is increased, then, the rotor 202 is rotated by a 180 degrees in the direction indicated by an arrow in FIG. 2 by a mutual action between the magnetic pole generated in the stator 201 and the magnetic pole of the rotor 202, and is stopped stably with the axis of magnetic poles A at an angle-$\theta 1$ position. The direction of rotation (counterclockwise direction in FIG. 2) for causing a normal operation (a timepiece hand advancing operation since it is an analogue electronic timepiece in this embodiment) by rotating the stepping motor 109 is referred to as a normal direction and the opposite direction (clockwise direction) is referred to as an reverse direction.

Subsequently, when a square wave drive pulse of an opposite polarity is supplied from the drive pulse selection circuit 104 to the terminals OUT1 and OUT2 of the coil 209 (the negative pole to the first terminal OUT1 and the positive pole to the second terminal OUT2, which are opposite polarities from the drive described above) and a current is flowed in the direction opposite from the direction indicated by an arrow in FIG. 2, the magnetic flux in the direction opposite from the direction indicated by the arrow of a broken line is generated in the stator 201. Accordingly, the saturable portions 210 and 211 are saturated first, then, the rotor 202 is rotated by a 180 degrees in the same direction as described above by the mutual action between the magnetic pole generated in the stator 201 and the magnetic pole of the rotor 202, and is stopped stably with the axis of magnetic poles A at the angle-$\theta 0$ position.

From then onward, the above-described action is repeatedly performed by supplying signals of different polarities (alternating signals) to the coil 209, so that the rotor 202 is allowed to rotate continuously in the directions indicated by arrows by 180 degrees. In this embodiment, a plurality of main drive pulses P10 to P1$m$ and a corrective drive pulse P2 having different energies from each other as described later are used as the drive pulses.

Figure 3:
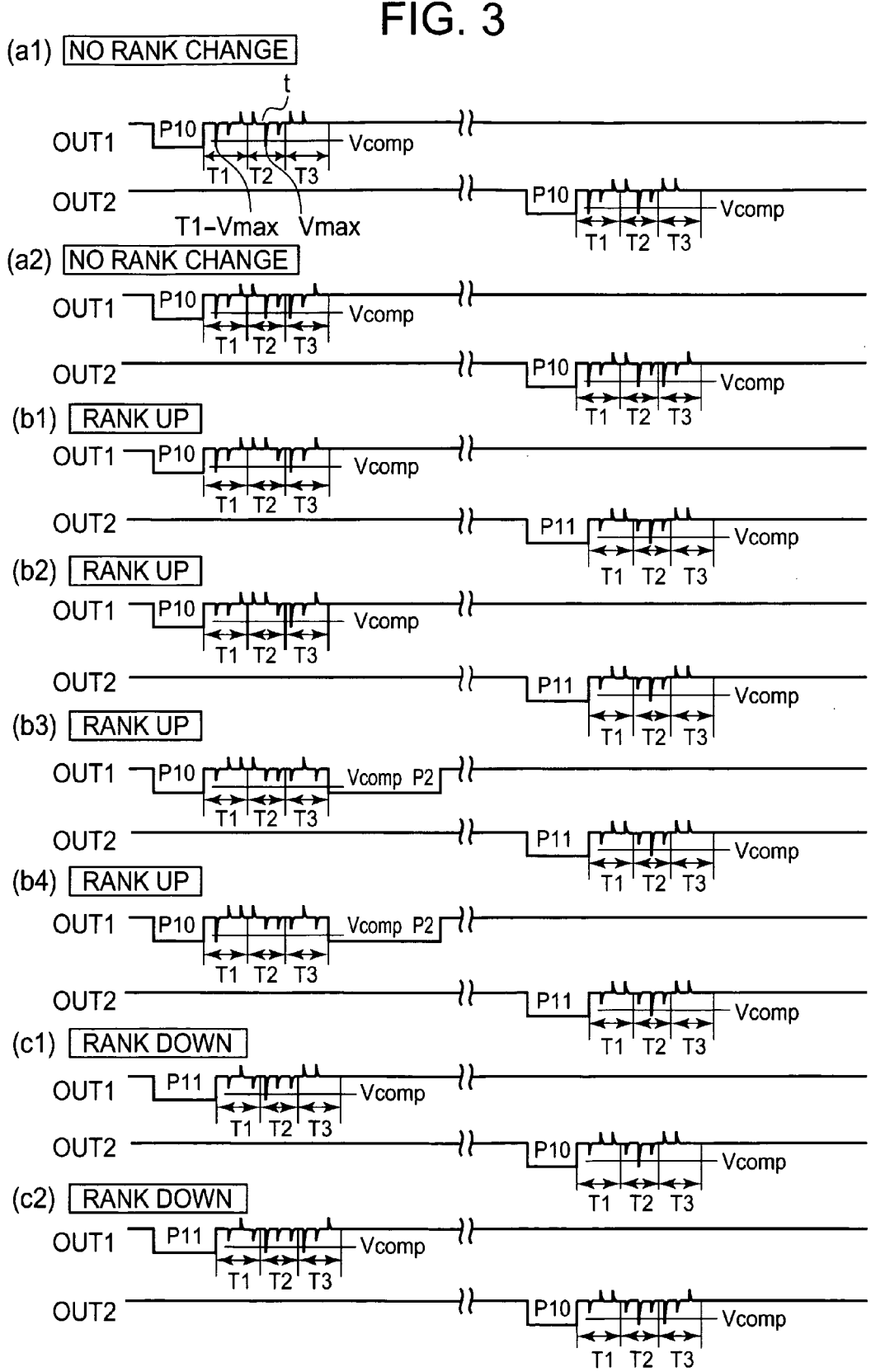
FIG. 3 is a timing chart for explaining the action of a stepping motor control circuit and the analogue electronic timepiece according to the embodiment of the present invention.

FIG. 3 is a timing chart showing a state in which the stepping motor 105 is driven with a main drive pulse P1$n$ of a rank n and the corrective drive pulse P2 in this embodiment.

In FIG. 3, the rank n of the main drive pulse P1$n$ has a plurality of ranks from a minimum value 0 to a maximum value m, and the energy of the pulse increase with increase of the value n (in this embodiment, the pulse width of the square wave is long). The corrective drive pulse P2 is a large energy pulse which is able to rotate the stepping motor 105 being applied an excessive load, and is configured to have energy as large as about ten times a main drive pulse P1. In other words, the respective drive pulses P10, P1$n$, P1$m$, and P2 are configured to satisfies a pulse width relation such as P10<P1$n$<P1$m$<P2.

Reference sign Vcomp designates a reference threshold voltage which determines the voltage level of the detection signal VRs which corresponds to an induced voltage generated by free oscillations of the stepping motor 105 as described above, in which reference sign t designates a time at which the detection signal VRs exceeding the reference threshold voltage Vcomp is detected.

A predetermined time immediately after the drive with the main drive pulse P1 is designated as a first segment T1, a predetermined time after the first segment T1 is designated as a second segment T2, and a predetermined time after the second segment T2 is designated as a third segment T3. In this manner, an entire detection segment T starting from a timing immediately after the drive with the main drive pulse P1 is divided into a plurality of segments (in this embodiment, three segments T1 to T3). The rotating state is detected by the detection signal of the same polarity in the respective segments T1 to T3. Also, the length of the respective segments T1 to T3 may be set so as to satisfy such relation as second segment T2<first segment T1≦third segment T3. In this embodiment, a mask segment, which is a segment in which the detection signal VRs is not detected, is not provided.

The term "immediately after the drive with the main drive pulse P1" means to be immediately at a time when the detection of rotation is substantially enabled, and means a time point when the detection of rotation is enabled after a predetermined time in a sampling cycle (for example, about 0.9 msec) in which a sampling process for the detection of rotation is disabled has elapsed after the termination of the drive with the main drive pulse P1, or a time point when a predetermined time in which the induced voltage generated by the termination of the drive of the main drive pulse P1 by itself affects the detection of rotation has elapsed.

Although detailed description will be given later, in the stepping motor control circuit according to the embodiment of the present invention, in an example of a loaded state shown in FIG. 2, assuming that P1 is an area in which the drive is performed with the drive pulse, the detection signal VRs corresponding to the induced voltage generated in an area a is detected in the first segment T1, the detection signal VRs generated in an area c is detected in segments T2 and T3 (the signal detected in second segment T2 has a larger reserved capacity of the drive energy than that detected in the third segment T3), and the detection signal VRs generated in an area b is detected across the first and second segments T1 and T2 in the opposite polarity.

In other words, since the detection signal VRs is generated by the free oscillations of the rotor 202 after having ended the drive pulse, the detection signal VRs induced in the first segment T1 is characterized by being generated to a timing limited to an area from a rotation without a reserved capacity (almost stopped) to an area having a certain degree of reserved drive capacity, and not being generated when the sufficient rotational force is remained (which corresponds to the area a in FIG. 2).

When the sufficient reserved drive capacity is remained, since the drive pulse is ended in the area b, the outputted induced voltage has an opposite phase. The height of the detection signal VRs in the first segment T1 is reversely proportional to the reduction of the reserved drive capacity by the movement of the rotor. Using such a property, the degree of reserved capacity of the drive energy is determined.

In view of such characteristics, in this embodiment, the detection segment starting immediately after the drive with the main drive pulse P1 is divided into a plurality of, at least three, segments, and the main drive pulse P1 is controlled according to the segment in which the rotation detection circuit 110 detects the detection signal VRs exceeding the reference threshold voltage Vcomp. For example, when the detection signal VRs exceeding the reference threshold voltage Vcomp is generated in the first segment T1, it is determined that the reserved rotation capacity e is reduced, and the drive pulse is maintained without changing to the drive pulse having a small energy, so that the drive pulse is not changed to a drive pulse having a small energy.

In this embodiment, as shown in FIG. 3, when the detection signal VRs which exceeds the reference threshold voltage Vcomp is detected at least in the first segment T1 and the second segment T2, the main drive pulse P1 is not changed (no rank change) (FIG. 3(a1) and FIG. 3(a2)), and the main drive pulse P1 is not changed also when the detection signal VRs exceeding the reference threshold voltage Vcomp is detected in all the segments of first segment T1, the second segment T2, and the third segment T3 (FIG. 3(a2)). As shown in FIG. 3(a1) and FIG. 3(a2), when the main drive pulse P1 is drive energy without a reserved capacity (rotation without a reserved capacity), the main drive pulse P1 is not changed and is maintained.

When the detection signal VRs exceeding the reference threshold voltage Vcomp is detected only in the first segment T1 and the third segment T3, the main drive pulse P1 is changed to a main drive pulse P1 having a large energy (the rank is moved up) without driving with the corrective drive pulse P2 (FIG. 3(b1), and when it is detected only in the third segment T3, the main drive pulse P1 is changed to a main drive pulse P1 having a large energy (the rank is moved up) without driving with the corrective drive pulse P2 (FIG. 3(b2)). As shown in FIG. 3(b1) and FIG. 3(b2), when the main drive pulse P1 is determined to have a least necessary drive energy to rotate the motor (rotation with a least energy), the main drive pulse is changed to a main drive pulse having a large energy.

When the detection signal VRs exceeding the reference threshold voltage Vcomp is detected only in the second segment T2, the main drive pulse P1 is changed to a main drive pulse P1 having a small energy (the rank is moved down) (FIG. 3(c1)), and when it is detected only in the second segment T2 and the third segment T3, the main drive pulse P1 is changed to a main drive pulse P1 having a small energy (the rank is moved down) (FIG. 3(c2)). As shown in FIG. 3(c1) and FIG. 3(c2), when the main drive pulse P1 is determined to have a reserved drive energy (rotation with a reserved capacity), the main drive pulse P1 is changed to a main drive pulse having a small energy.

When the detection signal VRs exceeding the reference threshold voltage Vcomp is not detected in any of the first segment T1 to the third segment T3, the drive with the corrective drive pulse P2 is performed, then the main drive pulse P1 is changed to a main drive pulse P1 having a large energy (the rank is moved up) (FIG. 3(b3)), and when it is detected only in the first segment T1, it is determined not to be rotated and the drive with the corrective drive pulse P2 is performed, and then the main drive pulse P1 is changed to a main drive pulse P1 having a large energy (the rank is moved up) (FIG. 3(b4)).

Figure 9:
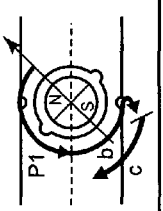
FIG. 9 is a timing chart for explaining the action of the stepping motor control circuit and the analogue electronic timepiece according to still another embodiment of the present invention.

FIG. 9 is a timing chart for explaining the above-described actions, and shows margins of the load, pattern showing the rotational position and rotating state of the rotor 202, and the pulse control actions when the stepping motor 105 is driven by the main drive pulse P1 together.

In FIG. 9, reference sign P1 designates the main drive pulse P1 and also shows a segment in which the rotor 202 of the stepping motor 105 is rotated with the main drive pulse P1, and reference signs a to e designate areas showing the rotational positions of the rotor 202 due to the free oscillations after the stop of the drive with the main drive pulse P1.

When the XY coordinate space in which main poles A of the rotor 202 are positioned is divided into a first quadrant I to a fourth quadrant IV according to the rotation thereof around the rotor 202 as the center (see FIG. 2), the first segment T1 to the third segment T3 may be expressed as follows.

In other words, in the state of the normal load, the first segment T1 corresponds to a segment for determining a state of the initial normal rotation of the rotor 202 in the third quadrant III in the space around the rotor 202 as the center and a segment for determining a state of the initial reverse rotation thereof, the second segment T2 corresponds to a segment for determining the state of the initial reverse rotation of the rotor 202 in the third quadrant III, and the third segment T3 corresponds to a segment for determining the rotating state after the state of the initial reverse rotation of the rotor 202 in the third quadrant III. Here, the normal load means a load applied in the normal operation, and in this embodiment, the load applied when the time hands are driven is referred to as the normal load.

As described above, the reference sign Vcomp means the reference threshold voltage which determines the voltage level of the induced signal (detection signal) VRs generated in the stepping motor 105, and the reference threshold voltage Vcomp is set in such a manner that the induced signal VRs exceeds the reference threshold voltage Vcomp when the rotor 202 makes a constantly fast action such as a case in which the stepping motor 105 is rotated, and the induced signal VRs does not exceed the reference threshold voltage Vcomp when the rotor 202 does not make the constantly fast action as in the case in which the stepping motor 105 does not rotate.

Assuming that P1 is an area in which the driving is performed with the drive pulse, the detection signal corresponding to the induced voltage generated in the area a is detected in the first segment T1, the induced signal VRs generated in the area c is detected in any of the segments T1 to T3 according to the load state (the signal detected in second segment T2 has a larger reserved drive energy than being detected in the third segment T3), and the induced signal VRs generated in the area b is detected in the first segment T1 or in the second segment T2 in the opposite polarity according to the load state. Also, since the induced signal VRs is generated by the free oscillations of the rotor 202 after having ended the drive pulse, the induced signal VRs induced in the first segment T1 is characterized by being generated to a timing limited to an area from a rotation without a reserved capacity (almost stopped) to an area having a certain degree of reserved drive capacity, and not being generated when the sufficient rotational force is remained. In this embodiment, in view of such a characteristic, the load is determined on the basis of the pattern of the induced signal VRs detected in the first segment T1 to the third segment T3 to control the drive pulse.

For example, in FIG. 9, in the stepping motor control circuit according to this embodiment, the induced signal VRs generated in the area b in the normal load state is detected in the first segment T1, the induced signal VRs generated in the area c is detected in the first segment T1 and the second segment T2, and the induced signal VRs generated after the area c is detected in the third segment T3.

Assuming that a decision value in a case where the rotation detection circuit 110 detects the induced signal VRs exceeding the reference threshold voltage Vcomp is "1", and a decision value in a case where the rotation detection circuit 110 cannot detect the induced signal VRs exceeding the reference threshold voltage Vcomp is "0", a pattern (0, 1, 0) is obtained as a pattern which indicates the rotating state (as a decision value in the first segment, a decision value in the second segment, and a decision value in the third segment)from the detection segment determination circuit 111 in the example of the normal load drive shown in FIG. 9. In the normal load, the control circuit 103 determines that the drive energy is excessively large (rotation with a reserved capacity), and controls the pulse so as to move the drive energy rank of the main drive pulse P1 downward (pulse down).

In a state in which a minimum load is increased from the state of the normal load (the state in which the increment of the load is minimum), the induced signal VRs generated in the area a is detected in the first segment T1, the induced signal VRs generated in the area b is detected in the first segment T1 and the second segment T2, and the induced signal generated in the area c is detected in the second segment T2 and the third segment T3. In the example shown in FIG. 9, the pattern (0, 1, 1) is detected, and the control circuit 103 determines it to be the rotation with a reserved capacity as described above, and controls the pulse so as to make the pulse down of the energy of the main drive pulse P1.

FIG. 9 also shows examples of a state of the middle load increment (the rotation without the reserved capacity) in which the pattern is (1, 1, 1) and the rank of the main drive pulse is maintained, a state of the an example of a non-rotating state of the large load increment (rotation with a least energy) in which the pattern is (1, 0, 1) and the rank of the drive energy of the main drive pulse P1 is moved up (pulse-up), and a state in which the pattern is (0, 0, 0) and the rotation is not achieved by the drive with the main drive pulse P1, so that the drive with the corrective drive pulse P2, and the pulse-up of the main drive pulse P1 are performed.

FIG. 4 is a decision chart in which the actions described above are shown in a table. As shown in FIG. 4, when the detection signal VRs exceeding the reference threshold voltage Vcomp is detected only in the second segment T2 or only in the second segment T2 and the third segment T3 (when the pattern is (0, 1, 1/0)), it is determined to be the rotation with a reserved capacity, in which the reserved drive energy remains, so that the main drive pulse P1 is moved one rank downward. The decision value "1/0" means that the decision value may be any of "1" and "0".

When the detection signal VRs exceeding the reference threshold voltage Vcomp is detected in all the segments T1 to T3 or only the first segment T1 and the second segment T2 (at least the first segment T1 and the second segment T2) (when the pattern is (1, 1, 1/0)), it is determined that the rotation without a reserved capacity in which there is no room for moving the rank of the drive energy down, and the main drive pulse P1 is maintained as is without change.

When the detection signal VRs exceeding the reference threshold voltage Vcomp is detected only in the first segment T1 and the third segment T3, or only in the third segment T3 (when the pattern is (1/0, 0, 1)), it is determined to be a rotation with a least energy in which the drive energy is remained by a least amount required, so that the main drive pulse P1 is moved one rank upward without driving with the corrective drive pulse P2.

When the detection signal VRs exceeding the reference threshold voltage Vcomp is detected only in the first segment T1 or is not detected in any one of the segments T1 to T3 (when the pattern is (1/0, 0, 0)), it is determined to be non-rotation, and the main drive pulse P1 is moved one rank upward after having driven with the corrective drive pulse P2.

Figure 5:
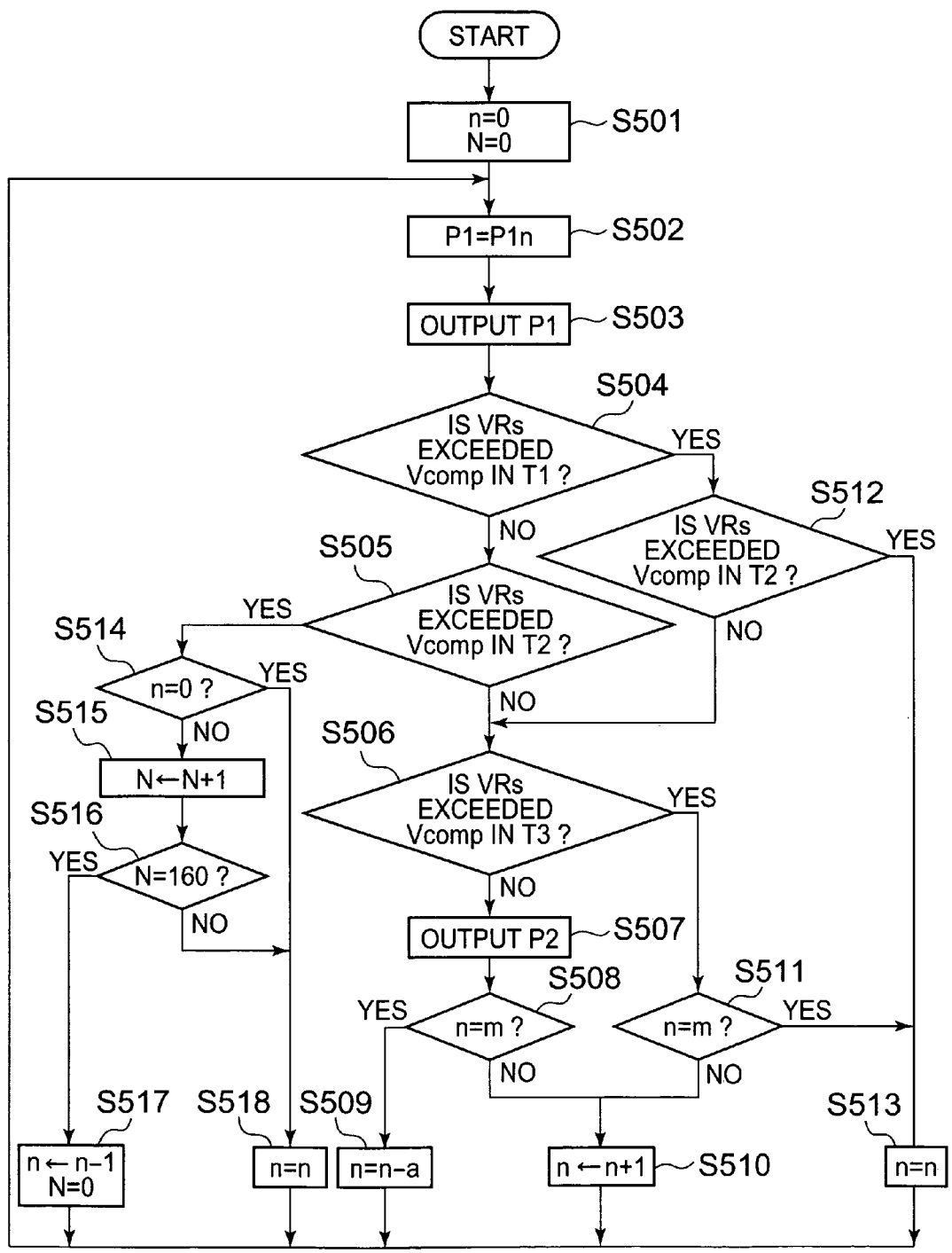
FIG. 5 is a flowchart showing the action of the stepping motor control circuit and the analogue electronic timepiece according to the embodiment of the present invention.

FIG. 5 is a flowchart showing an action of the stepping motor control circuit and the analogue electronic timepiece according to the embodiment of the present invention, and is a flowchart mainly showing the process of the control circuit 103.

Referring now to FIG. 1 to FIG. 5 and FIG. 9, the operation of the stepping motor control circuit and the analogue electronic timepiece according to the embodiment of the present invention will be described in detail.

In FIG. 1, the oscillation circuit 101 generates a reference clock signal of a predetermined frequency, and the frequency divider circuit 102 divides the signal generated in the oscillation circuit 101 to generate a clock signal as a reference of clocking, and outputs the same to the control circuit 103.

The control circuit 103 counts the clock signal, performs a clocking action, sets the rank n and number of times N of the main drive pulse P1$n$ to zero (Step S501 in FIG. 5), then outputs a control signal to rotate the stepping motor 105 with the main drive pulse P10 having a minimum pulse width (Steps S502 and S503).

The drive pulse selection circuit 104 rotates the stepping motor 105 with the main drive pulse P10 in response to the control signal from the control circuit 103. The stepping motor 105 is rotated with the main drive pulse P10, and rotates the time hands 107 to 109. Accordingly, when the stepping motor 105 is rotated normally, the display unit 106 displays a current time by the time hands 107 to 109 as needed.

The control circuit 103 determines whether or not the rotation detection circuit 110 detects the detection signal VRs of the stepping motor 105 which exceeds the predetermined reference threshold voltage Vcomp and determines whether or not the detection segment determination circuit 111 determines the detection time t of the detection signal VRs to be within the first segment T1. When it is determined that the detection signal VRs exceeding the reference threshold voltage Vcomp is not detected in the first segment T1 (Step S504), whether or not the detection signal VRs exceeding the reference threshold voltage Vcomp is detected in the second segment T2 in the same manner as described above (Step S505).

When it is determined that the detection signal VRs exceeding the reference threshold voltage Vcomp is not detected in the second segment T2 in process step S505, the control circuit 103 determines whether or not the detection signal VRs exceeding the reference threshold voltage Vcomp is detected in the third segment T3 in the same manner as describe above (Step S506).

When it is determined that the detection signal VRs exceeding the reference threshold voltage Vcomp is not detected in the third segment T3 (non-rotation with the pattern of (0, 0, 0)) in the process step S506, the control circuit 103 drives the stepping motor 105 with the corrective drive pulse P2 (Step S507), then if the rank n of the main drive pulse P1 is not a highest rank m, the main drive pulse P1 is moved one rank upward to a main drive pulse P1(n+1), and uses the main drive pulse P1(n+1) for the subsequent drive (Steps S508 and S510; FIG. 3(b3)).

When the rank n of the main drive pulse P1 is the highest rank m in the process step S508, the control circuit 103 changes the main drive pulse P1 to a main drive pulse P1(n−a) having less energy by a predetermined amount, and uses the main drive pulse P1(n−a) for the next drive (Step S509). At this time, the main drive pulse may be changed to a main drive pulse P10 having a minimum energy in order to achieve a significant power saving effect.

When it is determined that the detection signal VRs exceeding the reference threshold voltage Vcomp is detected in the third segment T3 (rotation with a least energy with the pattern of (0, 0, 1)) in the process step S506, if the rank n of the main drive pulse P1 is not the highest rank m, the control circuit 103 moves the main drive pulse P1 one rank upward to the main drive pulse P1(n+1), and uses the main drive pulse P1(n+1) for the next drive (Steps S511 and S510; FIG. 3(b2)).

If the rank n of the main drive pulse P1 is the highest rank m in the process step S511, the rank cannot be changed, so that the control circuit 103 does not change the main drive pulse P1 and uses this main drive pulse P1 for the next drive (Step S513).

When it is determined that the detection signal VRs exceeding the reference threshold voltage Vcomp is detected in the first segment T1 in process step S504, the control circuit 103 determines whether or not the detection signal VRs exceeding the reference threshold voltage Vcomp is detected in the second segment T2 in the same manner as describe above (Step S512).

When it is determined that the detection signal VRs exceeding the reference threshold voltage Vcomp is not detected in the second segment T2 in process step S512, the control circuit 103 goes to the process step S506. Either one of the actions shown in FIG. 3(b1) or FIG. 3(b4) is performed by performing the process as described above.

When it is determined that the detection signal VRs exceeding the reference threshold voltage Vcomp is detected in the second segment T2 (rotation without a reserved capacity with the pattern of (1, 1, 1/0)) in the process step S512, the control circuit 103 does not change the main drive pulse P1 and uses the main drive pulse P1 for the next drive (Step S513; FIG. 3(a1), FIG. 3(a2)).

In contrast, when it is determined that the detection signal VRs exceeding the reference threshold voltage Vcomp is detected in the second segment T2 (the rotation with a reserved capacity with the pattern of (0, 1, 1/0)) in the process step S505, since the rank cannot be changed when the rank n of the main drive pulse P1 is a lowest rank 0, the control circuit 103 uses this main drive pulse P1 for the next drive without changing the main drive pulse P1 (Steps S514 and S518).

When the rank n is not zero in the process step S514, the control circuit 103 adds one to the number of times N (Step S515). When the number of times N reaches a predetermined number (160 in this embodiment), the rank n of the main drive pulse P1 is moved one rank downward to (n−1), and the number of times N is reset to zero, and the process is returned to the process step 5502 (Step S517; FIG. 3(c1), FIG. 3(c2)). In other words, when the process from the process step S504 to the process steps S505, S514, and S515 are performed continuously by a plurality of times, the main drive pulse is moved one rank downward.

In the process step S516, if the number of times N is not the predetermined number of times, the control circuit 103 goes to the process step S518, and does not change the rank.

As described thus far, according to the stepping motor control circuit in this embodiment, it is possible to avoid the rank to be moved downward to a main drive pulse which has a potential to cause the non-rotating state. Also, since whether or not there is a reserved drive capacity is determined when rotating, and the drive pulse is not changed by determining the fact that the reserved drive capacity is reduced even when there is only a little reserved drive capacity, the rank is prevented from being moved downward to a drive pulse which has a potential to cause the non-rotating state. Accordingly, the driving with the corrective drive pulse may be avoided as much as possible, so that the power saving is enabled. Also, there is an advantage such that the design is released from the constraint to take an erroneous determination of the non-rotation into consideration.

Also, the analogue electronic timepiece having a stepping motor for rotating the time hands and the stepping motor control circuit for controlling the stepping motor has advantages such that avoidance of moving the rank of the main drive pulse downward to a main drive pulse which has a potential to cause the non-rotating state is achieved, so that an accurate clocking action is achieved.

Figure 6:
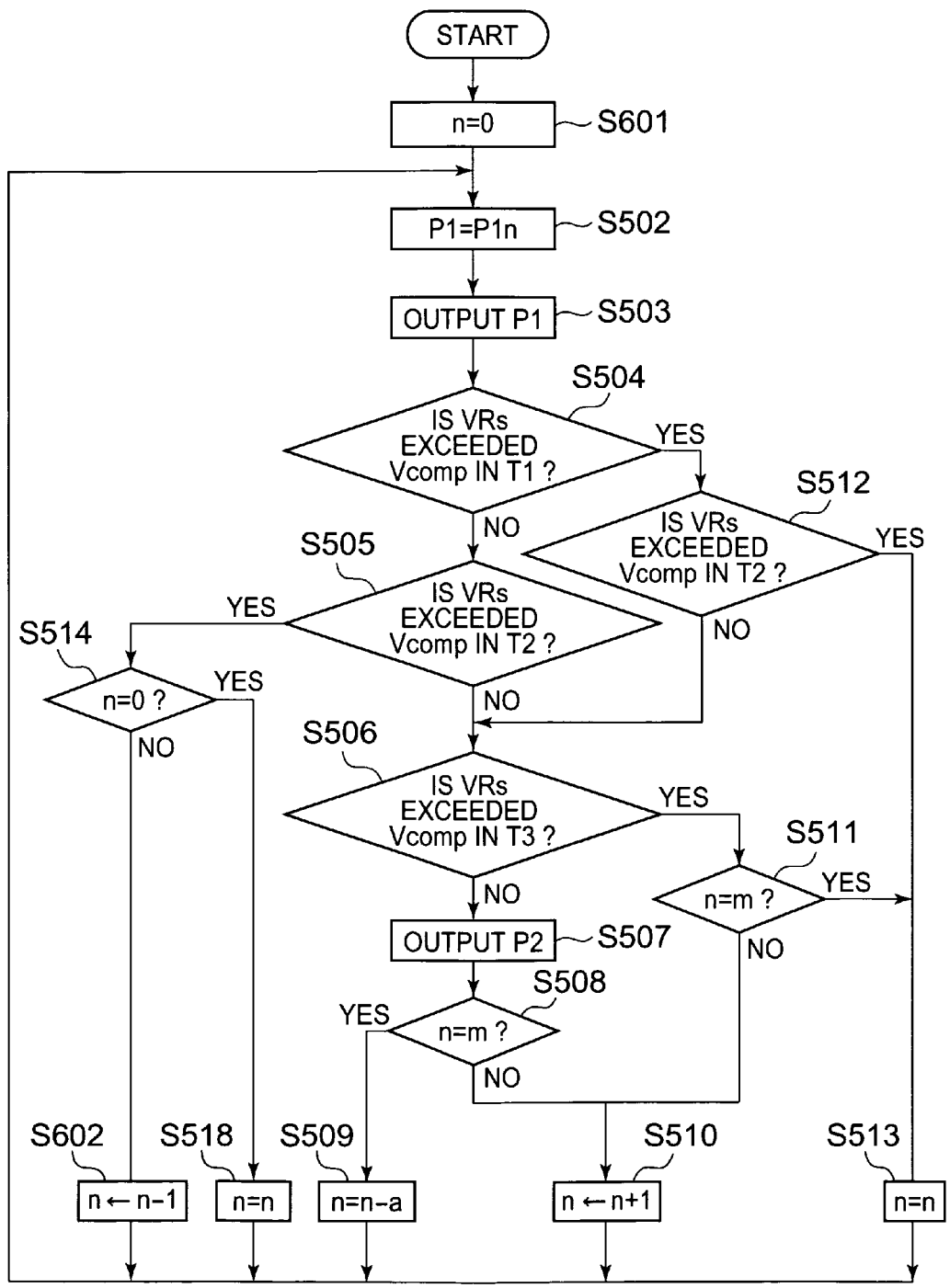
FIG. 6 is a flowchart showing the action of the stepping motor control circuit and the analogue electronic timepiece according to another embodiment of the present invention.

FIG. 6 is a flowchart showing a process in another embodiment of the present invention, and the same reference numerals are designated to the same components as in FIG. 5. Although the embodiment described above is configured to move the rank downward when the rotation is made continuously by a predetermined number of times (N times), this another embodiment is configured to move one rank downward when the detection signal VRs exceeding the reference threshold voltage Vcomp is detected once in the second segment T2 in the process step S505 and the main drive pulse P1 at that time is not the lowest rank 0 (the process steps S514 and S602). In this another embodiment, since the setting of the number of times N is not necessary, the initial setting of the number of times is not performed in the process step S601, and the rank n is initially set to the lowest rank 0.

In this another embodiment as well, the same advantages as in the above-described embodiment are achieved. Since the necessity of counting the number of times N is eliminated, the configuration is simple in comparison with the above-described embodiment.

Figure 7:
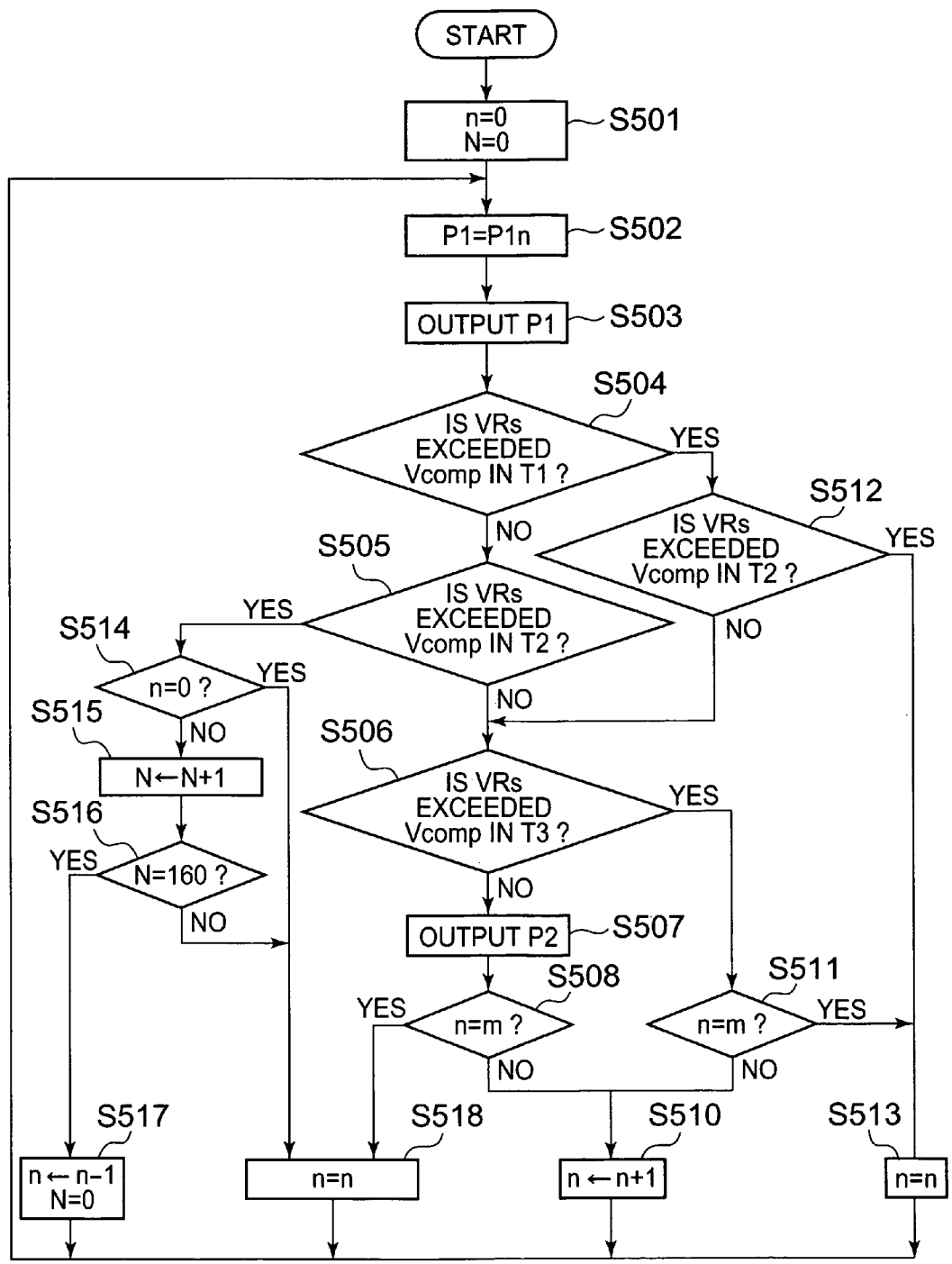
FIG. 7 is a flowchart showing the action of the stepping motor control circuit and the analogue electronic timepiece according to still another embodiment of the present invention.

FIG. 7 is a flowchart showing a process in still another embodiment of the present invention, and the same reference numerals are designated to the same components as in FIG. 5. Although the embodiment shown in FIG. 5 is configured to change the main drive pulse to a main drive pulse having a small energy when the main drive pulse has a maximum energy (Steps S508 and S509), this another embodiment is configured to go to the process step S518 and not to change the main drive pulse when the main drive pulse driven in the process step S508 is the maximum energy after having driven with the corrective drive pulse P2.

In this configuration, when the state in which the rotation is possible with the main drive pulse P1 again as in the case where the load of the motor is restored to the normal state by driving with the corrective drive pulse P2, a main drive pulse P1m having a maximum energy is used for the next drive, so that the further reliable rotation with the main drive pulse P1 is ensured. Therefore, when the normal state is restored, the possibility to avoid the driving with the corrective drive pulse P2 is increased, so that the energy saving is advantageously achieved.

Figure 8:
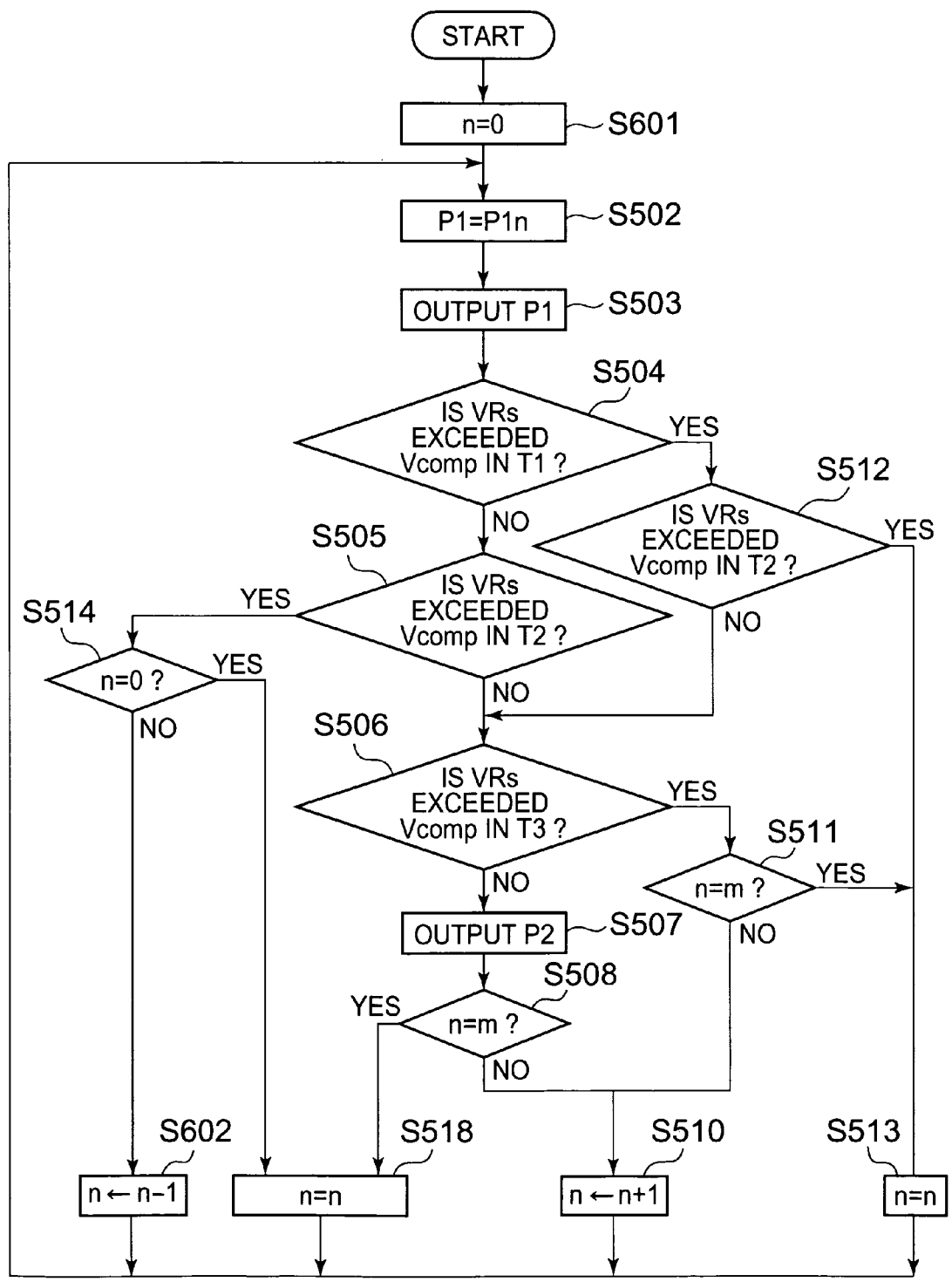
FIG. 8 is a flowchart showing the action of the stepping motor control circuit and the analogue electronic timepiece according to still another embodiment of the present invention.

FIG. 8 is a flowchart showing a process in still another embodiment of the present invention, and the same reference numerals are designated to the same components as in FIG. 6. Although the embodiment shown in FIG. 6 is configured to change the main drive pulse P1 to a main drive pulse having a small energy when the main drive pulse P1 has a maximum energy (Steps S508 and S509), this another embodiment is configured to go to the process step S518 and not to change the main drive pulse P1 when the main drive pulse P1 driven in the process step S508 is the maximum energy after having driven with the corrective drive pulse P2.

In this configuration, in the same manner as the embodiment shown in FIG. 7, when the motor load is restored to the normal state by the driving with the corrective drive pulse P2, the possibility to avoid the driving with the corrective drive pulse P2 is increased, so that the energy saving is advantageously achieved.

Subsequently, an example in which the detection segment is divided into four segments will be described.

Figure 10:
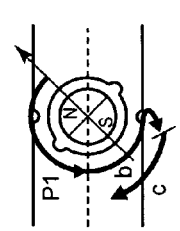
FIG. 10 is a timing chart for explaining the action of the stepping motor control circuit and the analogue electronic timepiece according to still another embodiment of the present invention.

FIG. 10 is a timing chart of the analogue electronic timepiece using a motor control circuit according to still another embodiment of the present invention, which shows the margins of the load and the rotational positions of the rotor 202 together. The block diagram and the configuration drawing of the stepping motor in this another embodiment are the same as FIG. 1 and FIG. 2.

In FIG. 10, reference sign P1 designates a segment in which the rotor 202 is rotated with the main drive pulse P1, and reference signs a to e designate segments showing the rotational positions of the rotor 202 due to the free oscillations after the termination of the drive with the main drive pulse P1.

The detection segment T for detecting the rotation of the stepping motor 105 is divided into four segments in sequence from a first segment T1a immediately after the driving with the main drive pulse P1, a second segment T1b, a third segment T2, to a fourth segment T3. In this manner, the entire detection segment T starting from a timing immediately after the drive with the main drive pulse P1 is divided into a plurality of segments (in this another embodiment, four segments T1a to T3). The rotating state is detected by the detection signal of the same pole in the respective segments T1a, T1b, T2, and T3.

The term "immediately after the drive with the main drive pulse P1" means to be immediately at a time when the detection of rotation is substantially enabled as the respective embodiments described above. A mask segment, which is a period in which the induced signal VRs is not detected, is not provided. Also, the lengths of the respective segments T1a, T1b, T2, and T3 may be set to satisfy such relations as third segment T2<(first segment T1a+second segment T1b) ≦fourth segment T3, and first segment T1a=second segment T1b, for example.

In the state in which a load smaller than the normal load is increased (the increment of the load is small), the first segment T1a corresponds to a segment in which the rotating state of the rotor 202 is determined in the second quadrant II of in the XY coordinate space around the axis of rotation of the rotor 202 as the center, the second segment T1b corresponds to a segment for determining the state of the initial normal rotation of the rotor 202 in the third quadrant III, the third segment T2 corresponds to a segment for determining the state of the initial normal rotation and the state of the initial reverse rotation of the rotor 202 in the third quadrant III, and the fourth segment T3 corresponds to a segment for determining the state of the initial reverse rotation and the state of rotation thereafter of the rotor 202 in the third quadrant III.

Also in the state of the normal load, the first segment T1a corresponds to a segment for determining the state of the initial normal rotation of the rotor 202 in the third quadrant III in the XY coordinate space around the axis of rotation of the rotor 202 of the stepping motor 105, the second segment T1b corresponds to a segment for determining the state of the initial normal rotation and the state of the initial reverse rotation of the rotor in the third quadrant III, the third segment T2 corresponds to a segment for determining the state of the initial reverse rotation of the rotor in the third quadrant III, and the fourth segment corresponds to a segment for determining the rotating state of the rotor after the initial reverse rotation in the third quadrant III. Here, the term "normal load" means a load driven in the normal operation as in the embodiment described above and, in this embodiment, the load for driving the time hands is defined as the normal load. The reference sign Vcomp designates a reference threshold voltage set in the same manner as the respective embodiments described above.

In FIG. 10, a summary of the stepping motor control circuit according to this another embodiment will be described. The induced signal corresponding to the induced voltage generated in the area a in the state in which the increment of the load is small is detected in the first segment T1a, the induced signal generated in the area b is detected across the second segment T1b and the third segment T2, and the induced signal generated in the area c is detected in the third segment T2 and the fourth segment T3.

When the drive energy of the main drive pulse P1 is in the state of the normal load, the timing of interception of the main drive pulse P1 passes the first segment T1a and the second segment T1b by, the induced signal VRs appears from the third segment T2 onward.

The induced signal VRs generated by the rotation of the stepping motor 105 appears consecutively in the first segment T1a and the second segment T1b when there is not more reserved capacity in rotation of the rotor 202, which indicates that the reserved rotation capacity is getting reduced.

When the load is increased and the state in which the increment of the load is small is assumed so that the drive force is rather lowered, and when the load is increased and the state in which the increment of the load is large is assumed so that there is no longer reserved rotation capacity of the rotor, the timing of interception of the main drive pulse P1 is first segment T1a or earlier, and the time when peaks of the induced signals VRs in both cases appears in the first segment T1a, and hence if it is the former or the latter cannot be determined. However, by combining with the result of detection of the induced signal VRs in the second segment T1b, discrimination between the state of rotation of the rotor having no longer reversed capacity or the state in which the drive force is slightly lowered is enabled.

In view of such characteristics, the reserved drive capacity is determined accurately, and the drive control with an adequate drive pulse is performed. In this another embodiment, when the induced signal VRs in the second segment Tb exceeds the predetermined reference threshold voltage Vcomp (when the decision value is "1"), it is determined to be the rotation with a least energy, and the main drive pulse P1 is moved one rank upward. Accordingly, the efficient control of the corrective drive pulse is achieved without performing the drive with the corrective drive pulse P2, and hence reduction of the power consumption is enabled.

In this another embodiment, it is possible to determine whether to maintain the main drive pulse having the same drive energy or to change the main drive pulse to a main drive pulse having a smaller drive energy by sensing the rotating state of the rotor by the induced signals VRs in the first segment T1a and the second segment T1b.

For example, when the induced signal VRs in the first segment T1a exceeds the reference threshold voltage Vcomp, but the induced signal VRs in the second segment T1b does not exceed the reference threshold voltage Vcomp and the induced signal VRs in the third segment T2 exceeds the reference threshold voltage Vcomp, it is determined that the rotation is the rotation without a reserved capacity in which the main drive pulse is a drive energy without a reserved capacity, so that the main drive pulse P1 is not changed and a main drive pulse P1 having the same energy is maintained.

For example, on the basis of the result of comparison of the induced signal VRs with the reference threshold voltage, the drive pulse is switched to the drive pulse in which the energy is changed. More specifically, when the induced signal VRs in the first segment T1a and the induced signal VRs of the second segment T1b are reference threshold voltage Vcomp or lower, and the induced signal VRs in the third segment T2 exceeds the reference threshold voltage Vcomp, it is determined to be the rotation with a reserved capacity in which the main drive pulse is a drive energy having a reserved capacity, and the main drive pulse is changed to a main drive pulse P1 having a small energy. When the induced signal VRs in the second segment T1b exceeds the reference threshold value Vcomp and the induced signal VRs in at least one of the third segment T2 and the fourth segment T3 exceeds the reference threshold voltage Vcomp, it is determined to be the rotation with a least energy in which the main drive pulse has a least drive energy required for the rotation, and the main drive pulse is changed to a main drive pulse P1 having a large energy.

Accordingly, the normal driving, the rotating state of the rotor in which the driving force is slightly lowered, and the rotating state having no reserved rotation capacity of the rotor may be discriminated, so that the prevention of the erroneous determination in determination of the rotation of the rotor is reliably realized. Also, the behavior of the rotor immediately before becoming the non-rotating state may be grasped by the induced voltage, so that an efficient control of the corrective driving output is achieved, which contributes to the reduction of power consumption.

FIG. 11 is a determination chart in which the actions in this another embodiment is shown in a table.

As shown in FIG. 11, when the rotation detection circuit 110 detects the induced signal VRs exceeding the reference threshold voltage Vcomp in the second segment T1b, it is determined to be the rotation with a least energy in which the main drive pulse P1 only has the least required drive energy (the inclement of the load is large) or the non-rotation, and the main drive pulse P1 is changed to a main drive pulse P1 having a large energy (pulse up (also referred to as rank up)).

At this time, when the rotation detection circuit 110 detects the induced signal exceeding the reference threshold voltage Vcomp in the second segment T1b and detects the same in the third segment T2 or in the fourth segment T3, it is determined to be the rotation with a least energy (the increment of the load is large) in which the main drive pulse P1 only has the least required drive energy, and the main drive pulse P1 is changed to a main drive pulse P1 having a large energy without performing the drive with the corrective drive pulse P2. Accordingly, the driving with the corrective drive pulse P2 may be reduced, so that the power saving is enabled.

Also, at this time, when the rotation detection circuit 110 detects the induced signal exceeding the reference threshold voltage Vcomp in the second segment T1b, but not in the third segment T2 and the fourth segment T3, it is determined to be the non-rotation, and the main drive pulse P1 is changed to a main drive pulse P1 having a large energy after having performed the drive with the corrective drive pulse P2.

When the rotation detection circuit 110 does not detect the induced signal exceeding the reference threshold voltage Vcomp in the second segment T1b, and detects the same in the first segment T1a and the third segment T2, it is determined to be an adequate drive and not to be necessary to move the rank of the drive energy downward or upward, that is, it is determined to be a rotation without a reserved capacity, in which the main drive pulse has a drive energy having no reserved capacity (increment of the load is small), so that the main drive pulse P1 is not changed and is maintained as is.

Also, when the rotation detection circuit 110 does not detect the induced signal exceeding the reference threshold voltage Vcomp in the first segment T1a and the second segment T1b, and detects the same in the third segment T2, it is determined to be the rotation with a reserved capacity in which the main drive pulse P1 has a reserved drive energy (normal load), and the main drive pulse P1 is changed to a main drive pulse P1 having a small energy (pulse down (also referred to as rank down)).

Figure 12:
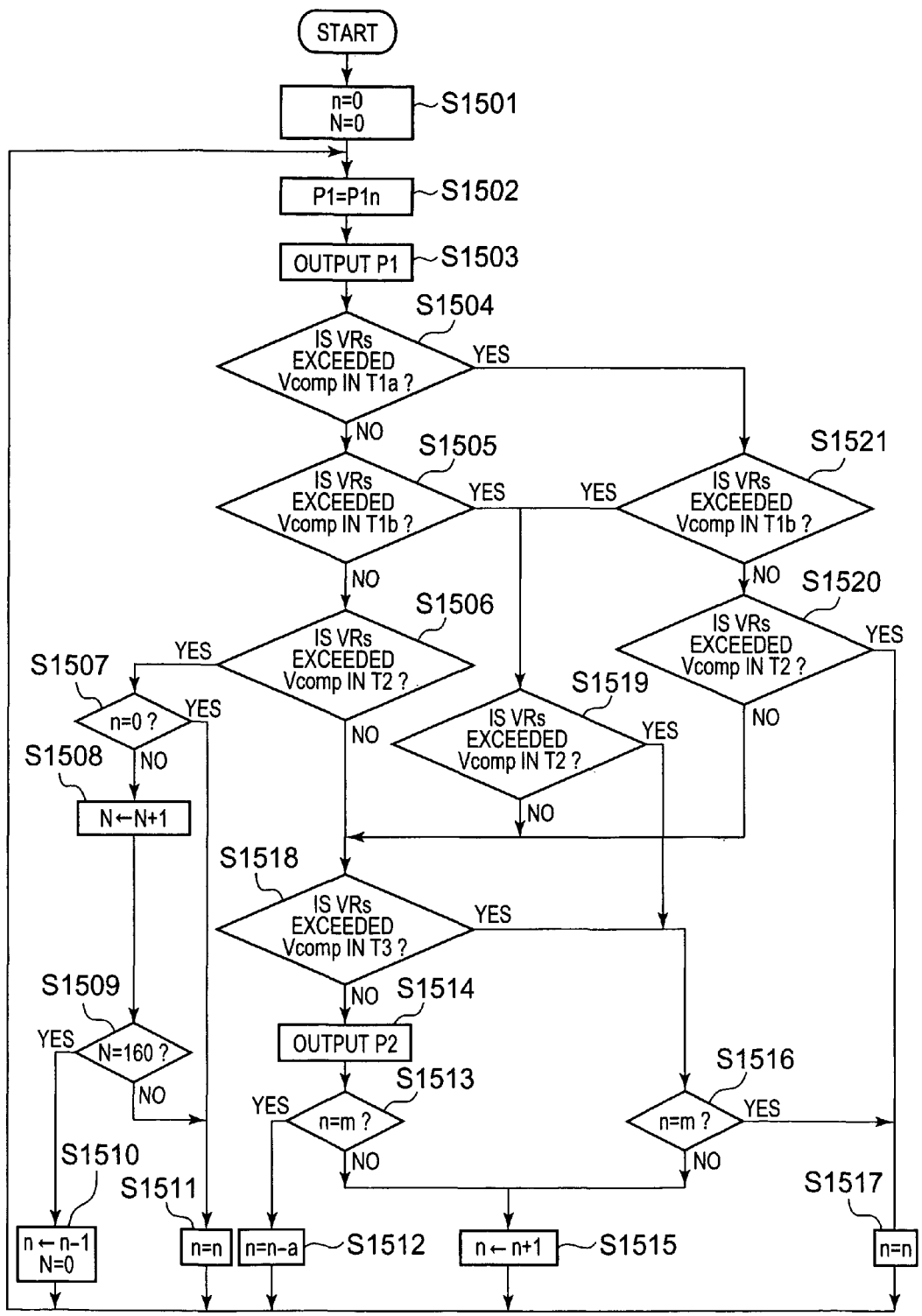
FIG. 12 is a flowchart showing the action of the stepping motor control circuit and the analogue electronic timepiece according to still another embodiment of the present invention.

FIG. 12 is a flowchart showing an action of the stepping motor control circuit and the analogue electronic timepiece according to this another embodiment, and is a flowchart mainly showing the process of the control circuit 103.

Referring now to FIG. 1, FIG. 2, and FIG. 10 to FIG. 12, the actions of the stepping motor control circuit and the analogue electronic timepiece according to this another embodiment will be described.

In FIG. 1, the oscillation circuit 101 generates a reference clock signal of a predetermined frequency, and the frequency divider circuit 102 divides the signal generated in the oscillation circuit 101 to generate a clock signal as a reference of the clocking, and outputs the same to the control circuit 103.

The control circuit 103 counts the clock signal, and performs a clocking action, sets the rank n and the number of times N of the main drive pulse P1n to zero (Step S1501 in FIG. 12), then outputs a control signal to rotate the stepping motor 105 with the main drive pulse P10 having a minimum pulse width (Steps S1502 and S1503).

The drive pulse selection circuit 104 rotates the stepping motor 105 with the main drive pulse P10 in response to the control signal from the control circuit 103. The stepping motor 105 is rotated with the main drive pulse P10, and rotates the time hands 107 to 109. Accordingly, when the stepping motor 105 is rotated normally, the display unit 106 displays a current time by the time hands 107 to 109 as needed.

The control circuit 103 determines whether or not the rotation detection circuit 110 detects the induced signal VRs of the stepping motor 105 which exceeds the predetermined reference threshold voltage Vcomp and determines whether or not the detection segment determination circuit 111 determines the detection time t of the induced signal VRs to be within the first segment T1a (Step S1504). When it is determined that the induced signal VRs exceeding the reference threshold voltage Vcomp is not detected in the first segment T1a, whether or not the induced signal VRs exceeding the reference threshold voltage Vcomp is detected in the second segment T1b in the same manner as described above (Step S1505).

When it is determined that the induced signal VRs exceeding the reference threshold voltage Vcomp is not detected in the second segment T1b in process step S1501, the control circuit 103 determines whether or not the induced signal VRs exceeding the reference threshold voltage Vcomp is detected in the third segment T2 in the same manner as describe above (Step S1506).

When it is determined that the induced signal VRs exceeding the reference threshold voltage Vcomp is not detected in the third segment T2 in process step S1506, the control circuit 103 determines whether or not the induced signal VRs exceeding the reference threshold voltage Vcomp is detected in the fourth segment T3 in the same manner as describe above (Step S1518).

When it is determined that the induced signal VRs exceeding the reference threshold voltage Vcomp is not detected in the fourth segment T3 (with the pattern of (0, 0, 0, 0)) in the process step S1518, it is the non-rotation, and the control circuit 103 drives the stepping motor 105 with the corrective drive pulse P2 (Step S1514), then if the rank n of the main drive pulse P1 is not the highest rank m, the main drive pulse P1 is moved by one rank upward to the main drive pulse P1(n+1), and uses the main drive pulse P1(n+1) for the subsequent drive (Steps S1513 and S1515).

When the rank n of the main drive pulse P1 is the highest rank m in the process state S1513, it is determined that the rotation is not possible even with the main drive pulse P1m which is the maximum energy for the next time, and the control circuit 103 changes the main drive pulse P1 to the main drive pulse P1(n−a) having less energy by a predetermined amount for reducing the power consumption, and uses the main drive pulse P1(n−a) for the subsequent drive (Step S1512). At this time, the drive pulse P1 may be changed to the main drive pulse P10 having the smallest energy in order to achieve the large power saving effect.

When it is determined that the induced signal VRs exceeding the reference threshold voltage Vcomp is not detected in the fourth segment T3 (rotation with a least energy with the pattern of (0, 0, 0, 1)) in the process step S1518, if the rank n of the main drive pulse P1 is not the highest rank m, the control circuit 103 goes to the process step S1515 and, if the rank n of the main drive pulse P1 is the highest rank m, since the rank cannot be moved upward, goes back to the process step S1502 without changing the main drive pulse P1 (Steps S1516 and S1517).

When it is determined that the induced signal VRs exceeding the reference threshold voltage Vcomp is detected in the second segment T1b in process step S1505, the control circuit 103 determined whether or not the induced signal VRs exceeding the reference threshold voltage Vcomp is detected in the third segment T2 (Step S1519).

When it is determined that the induced signal VRs exceeding the reference threshold voltage Vcomp is not detected in the third segment T2 in process step S1519, the control circuit 103 goes to the process step S1518.

When it is determined that the induced signal VRs exceeding the reference threshold voltage Vcomp is detected in the third segment T2 in process step S1519 (the rotation with a least energy with the pattern of (0, 1, 1, 1/0)), the control circuit 103 goes to the process step S1516.

When it is determined that the induced signal which indicates the rotation exceeding the reference threshold voltage Vcomp is detected in the first segment T1a in process step S1504, the control circuit 103 determined whether or not the induced signal VRs exceeding the reference threshold voltage Vcomp is detected in the second segment T1b (Step S1521).

When it is determined that the induced signal VRs exceeding the reference threshold voltage Vcomp is not detected in the second segment T1b in process step S1521, the control circuit 103 determines whether or not the induced signal VRs exceeding the reference threshold voltage Vcomp is detected in the third segment T2 (Step S1520).

When it is determined that the induced signal VRs exceeding the reference threshold voltage Vcomp is not detected in the third segment T2 in process step 51520, the control circuit 103 goes to the process step S1518, and when it is determined that the induced signal VRs exceeding the reference threshold voltage Vcomp is detected in the third segment T2 (the rotation without a reserved capacity with the pattern of (1, 0, 1, 1/0)), the procedure goes to the process step S1517.

When it is determined that the induced signal VRs exceeding the reference threshold voltage Vcomp is detected in the second segment T1b in process step S1521, the control circuit 103 goes to the process step S1519.

In contrast, when it is determined that the induced signal VRs exceeding the reference threshold voltage Vcomp is detected in the third segment T2 (the rotation with a reserved capacity with the pattern of (0, 0, 1, 1/0) in the process step S1506, since the rank cannot be moved downward when the rank n of the main drive pulse P1 is the lowest rank 0, the control circuit 103 uses this main drive pulse P1 for the next drive without changing the main drive pulse P1 (Steps S1507 and S1511).

When the rank n is not zero in the process step S1507, the control circuit 103 adds one to the number of times N (Step S1508). When the number of times N reaches a predetermined number (160 in this embodiment), the rank n of the main drive pulse P1 is moved one rank downward to (n−1), and the number of times N is reset to zero, and the procedure is returned to the process step S1502 (Step S1510). In other words, when the process from the process step S1504 to the process steps S1505, and S1506 to S1509 are performed continuously by a predetermined number of times, the main drive pulse is moved one rank downward.

In the process step S1509, if the number of times N is not the predetermined number of times, the control circuit 103 goes to the process step S1511, and does not change the rank.

As described thus far, according to the stepping motor control circuit in this another embodiment, the rotation detection segment of the stepping motor is divided into the first segment T1a for determining the rotating state of the rotor 202 in the second quadrant II, the second segment T1b for determining the normal rotating state of the rotor 202 in the third quadrant III, the third segment T2 for determining the normal and reverse rotating state of the rotor 202 in the third quadrant III and the fourth segment T3 for determining the reverse rotating state of the rotor 202 in the third quadrant III in a state in which the increment of the load is small and, when the rotation detection circuit 110 detects the induced signal VRs exceeding the reference threshold voltage Vcomp in the second segment T1b, the main drive pulse P1 is controlled to be changed to a main drive pulse P1 having a large energy.

Also, in a state of the normal load, the first segment T1a is configured to be a segment for determining the state of the initial normal rotation of the rotor 202 in the third quadrant III in the space around the axis of rotation of the rotor 202 of the stepping motor 105, the second segment T1b is configured to be a segment for determining the state of the initial normal rotation and the state of the initial reverse rotation of the rotor 202 in the third quadrant III, the third segment T2 is configured to be a segment for determining the state of the initial reverse rotation of the rotor 202 in the third quadrant III, and the fourth segment T3 is configured to be a segment for determining the state of rotation after the initial reverse rotation of the rotor 202 in the third quadrant II, so that the drive pulse is controlled according to the segment in which the rotation detection circuit 110 detects the induced signal VRs exceeding the reference threshold voltage Vcomp.

In this manner, by performing the drive pulse control on the basis of the induced signal VRs generated in the rotation detection segment immediately after the interception of the main drive pulse P1, an accurate detection of rotation is performed and the stability of the drive pulse control is realized while being hardly affected by the variations or fluctuations of the load from the gear train or the like, so that the generation of the excessive pulse-up control is restrained thereby achieving reduction of the current consumption.

Also, the drive control with the adequate drive pulse is enabled by accurately determined the reserved drive capacity, and the efficient control of the corrective drive pulse is enabled, and the reduction of power consumption is achieved.

Also, the degree of the reserved drive capacity such as the normal driving state, the rotating state of the rotor with the driving force slightly lowered, the rotating state of the rotor without a reserved rotation capacity and so on may be determined accurately, so that the prevention of the erroneous determination in determination of the rotation of the rotor is reliably realized.

Also, the behavior of the rotor immediately before becoming the non-rotating state may be grasped by the induced signal, so that an advantage such that an efficient control of the corrective drive pulse is achieved, which contributes to the reduction of power consumption.

Also, in the analogue electronic timepiece having the stepping motor for rotating the time hands and a stepping motor control circuit for controlling the stepping motor, since the reserved drive capacity is accurately determined, so that the generation of the excessive pulse-up control is restrained thereby achieving reduction of the current consumption. Also, prevention of moving the rank of the main drive pulse downward to the main drive pulse having a potential to cause the non-rotating state is achieved, so that an advantage that the clocking action is performed accurately is achieved.

Figure 13:
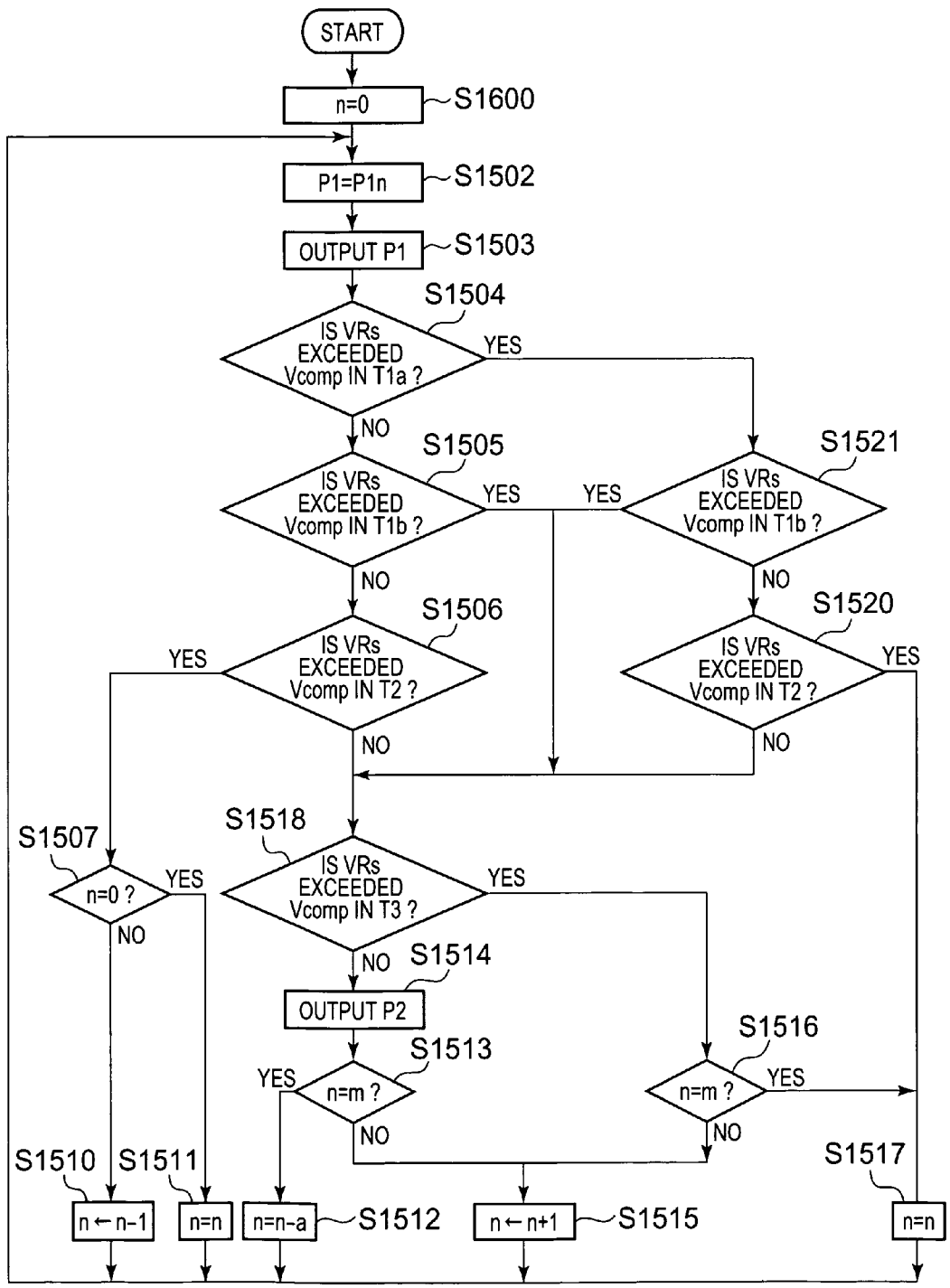
FIG. 13 is a flowchart showing the action of the stepping motor control circuit and the analogue electronic timepiece according to still another embodiment of the present invention.

FIG. 13 is a flowchart showing the process according to further another embodiment of the present invention. Although the embodiment shown in FIG. 12 is configured to move the rank downward when the rotation is made continuously by a predetermined number of times (N times), this another embodiment is configured to move one rank downward when the induced signal VRs exceeding the reference threshold voltage Vcomp is detected once in the third segment T2 in the process step S1506 and the main drive pulse P1 at that time is not the lowest rank 0 (the process steps S1600, S1507, S1510, and S1511).

Also, this another embodiment is configured to go to the process step S1518 immediately when it is determined that the induced signal VRs exceeding the reference threshold voltage Vcomp is detected in the segment T1b in the process step S1505 and the process step S1521.

Since the necessity of counting the number of times N is eliminated in the another embodiment, the initial setting of the number of times is not performed in the process step S1600, and only the rank n is initially set to the lowest lank 0.

In this another embodiment as well, the same advantages as in the above-described another embodiment are achieved. Since the necessity of counting the number of times N is eliminated, the configuration is simple in comparison with the above-described another embodiment.

Figure 14:
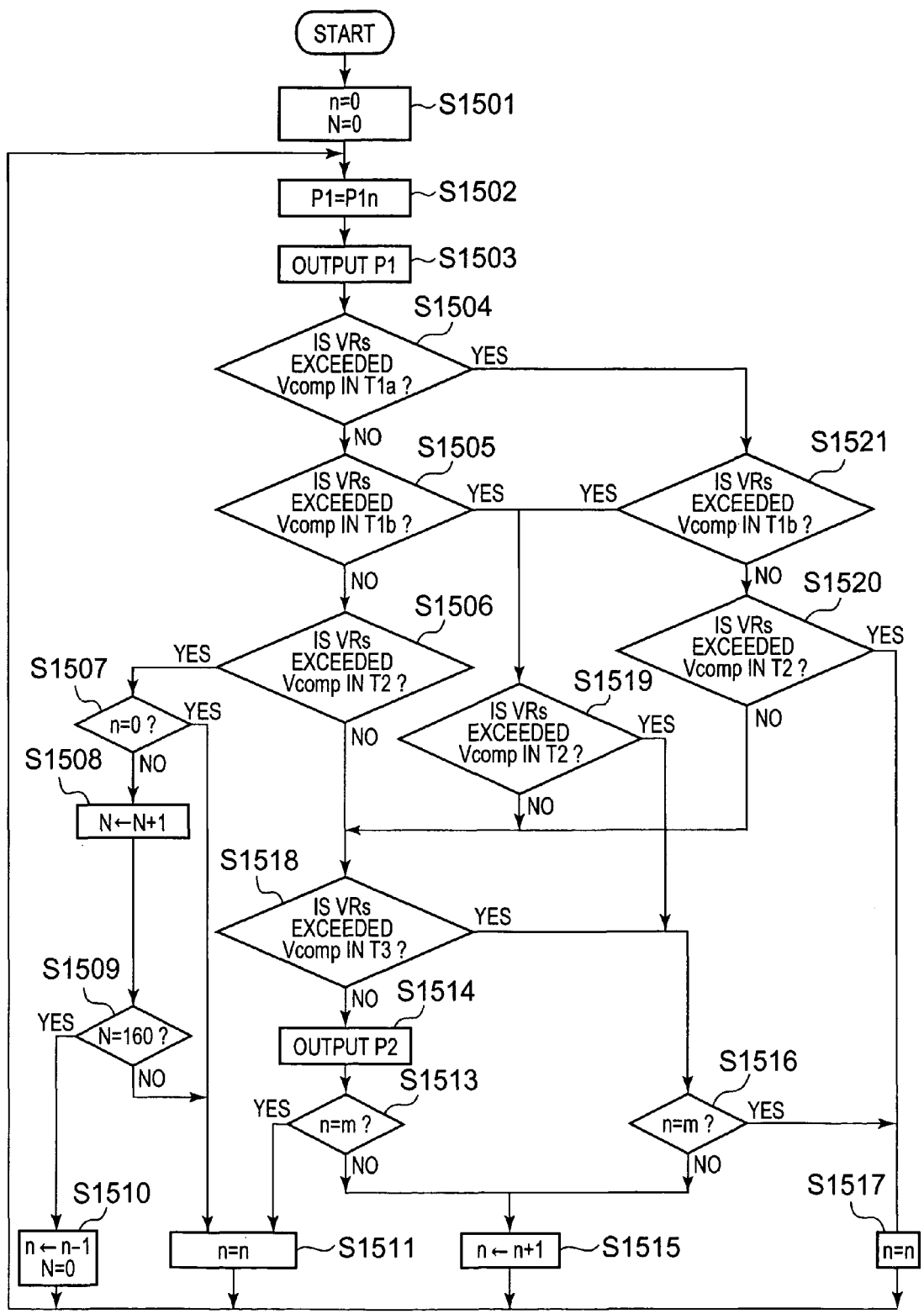
FIG. 14 is a flowchart showing the action of the stepping motor control circuit and the analogue electronic timepiece according to still another embodiment of the present invention.

FIG. 14 is a flowchart showing the process according to further another embodiment of the present invention. Although the embodiment shown in FIG. 12 is configured to change the main drive pulse to a main drive pulse having a small energy when the main drive pulse has a maximum energy (Steps S1513 and S1512), this another embodiment is configured to go to the process step S1511 and not to change the main drive pulse P1 when the main drive pulse P1 driven in the process step S1513 is the maximum energy after having driven with the corrective drive pulse P2.

In this configuration, when the state in which the rotation is possible with the main drive pulse is restored again as in the case where the load of the motor is restored to the normal state by driving with the corrective drive pulse P2, the main drive pulse P1m having a maximum energy is used for the next drive, so that the further reliable rotation with the main drive pulse P1m is ensured. Therefore, when the normal state is restored, the possibility to avoid the driving with the corrective drive pulse P2 is increased, so that the energy saving is advantageously achieved.

Figure 15:
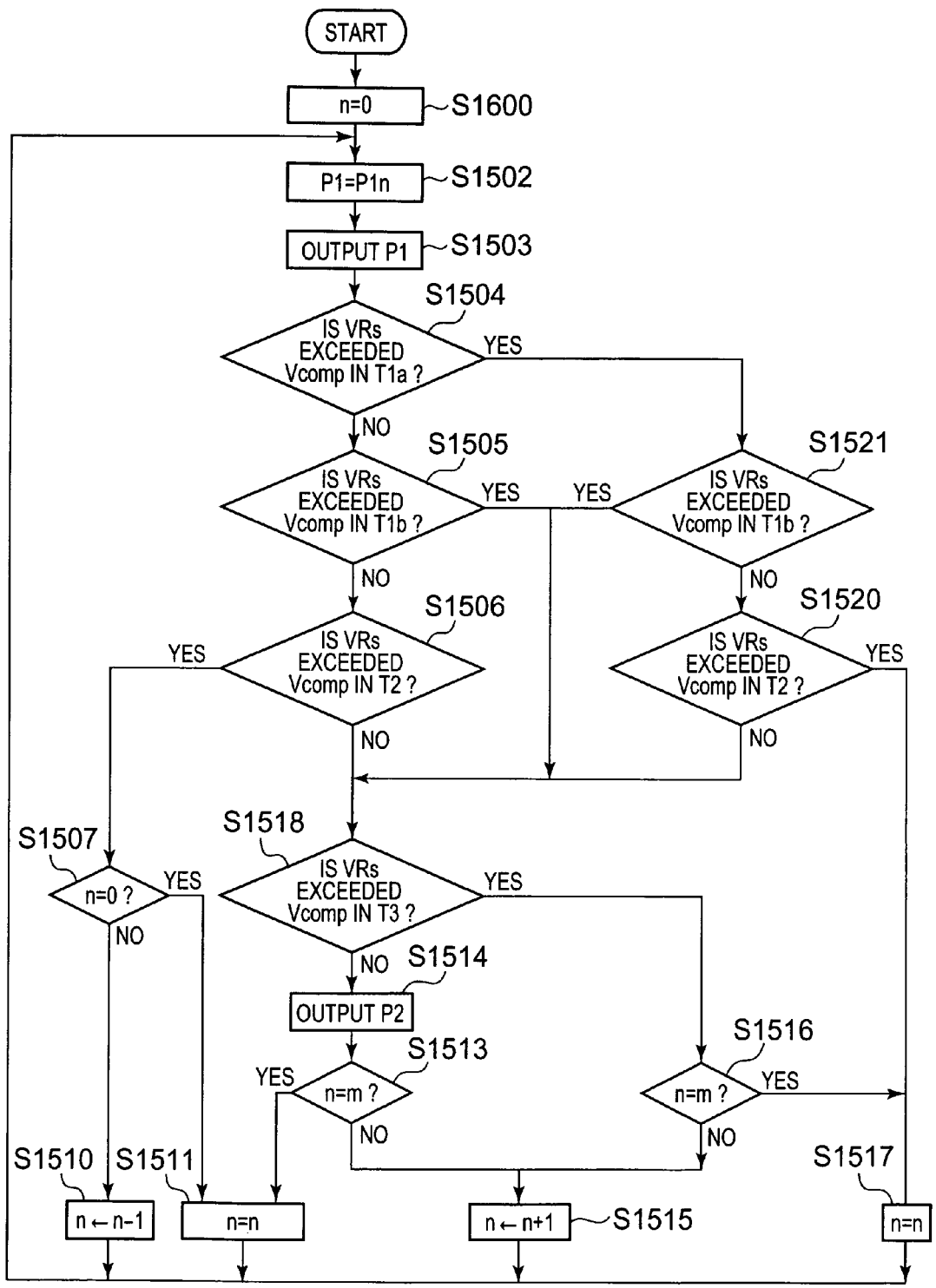
FIG. 15 is a flowchart showing the action of the stepping motor control circuit and the analogue electronic timepiece according to still another embodiment of the present invention.

FIG. 15 is a flowchart showing the process according to further another embodiment of the present invention. Although the embodiment shown in FIG. 13 is configured to change the main drive pulse to a main drive pulse having a small energy when the main drive pulse has a maximum energy (Steps S1513 and S1512), this another embodiment is configured to go to the process step S1511 and not to change the main drive pulse P1 when the main drive pulse P1 driven in the process step S1513 is the maximum energy after having driven with the corrective drive pulse P2.

In this configuration, as in the embodiment shown in FIG. 14, when the motor load is restored to the normal state by the drive with the corrective drive pulse P2 or the like, the possibility to avoid the driving with the corrective drive pulse P2 is increased, so that the energy saving is advantageously achieved.

In the respective embodiments described above, the pulse widths are differentiated in order to change the energy of the respective main drive pulses P1. However, the drive energy may be changed by changing the pulse voltage or the like. It is also possible to employ a main drive pulse P1 having a chopping waveform of a comb-shape, and changes the drive energy of the main drive pulse P1 by changing the number of chops or the duty ratio.

The present invention may also be applied to a stepping motor for driving a calendar or the like in addition to the time hands.

Also, although the electronic timepiece has been described as the example of the application of the stepping motor, it may be applicable to the electronic instruments which use the motor.

The stepping motor control circuit according to the present invention may be applicable to various electronic instruments using the stepping motor.

The electronic timepiece according to the present invention is applicable to various analogue electronic timepieces such as analogue electronic wrist timepieces with a calendar function, analogue electronic stand clocks with a calendar function as well as to various analogue electronic timepieces with the calendar function.

What is claimed is:

1. A stepping motor control circuit comprising:
   a rotation detecting unit configured to detect a detection signal generated by a rotation of a stepping motor and detect a rotating state of the stepping motor according to whether the detection signal exceeds a predetermined reference threshold voltage within a predetermined detection segment or not; and
   a control unit configured to control the drive of the stepping motor with one of a plurality of main drive pulses different in energy from each other or a corrective drive pulse having large energy than the respective main drive pulse according to the result of detection by the rotation detecting unit,
   wherein the detection segment starting immediately after the drive with the main drive pulse is divided into a plurality of, three or more segments, and the control unit controls the main drive pulse according to the segment in which the rotation detecting unit detects the detection signal exceeding the reference threshold voltage.

2. A stepping motor control circuit according to claim 1, wherein the rotating state is detected with the detection signal of the same polarity of the respective segments.

3. A stepping motor control circuit according to claim 1, wherein the control unit does not change the main drive pulse when it is determined that the rotation is a rotation without a reserved capacity in which the main drive pulse has drive energy without a reserved capacity.

4. A stepping motor control circuit according to claim 1, wherein the control unit changes the main drive pulse to a main drive pulse having large energy when it is determined to be a rotation with least energy in which the main drive pulse has drive energy having least required drive energy for the rotation.

5. A stepping motor control circuit according to claim 1, wherein the control unit changes the main drive pulse to a main drive pulse having small energy when it is determined to be a rotation with a reserved capacity in which the main drive pulse has drive energy having a reserved capacity.

6. A stepping motor control circuit according to claim 1, wherein the control unit drives with the corrective drive pulse and then changes the main drive pulse to a main drive pulse having large energy when it is determined that the stepping motor is not rotated.

7. A stepping motor control circuit according to claim 1, wherein the detection segment is divided into a first segment immediately after the drive with the main drive pulse, a second segment after the first segment, and a third segment after the second segment.

8. A stepping motor control circuit according to claim 7, wherein the control unit does not change the main drive pulse when the rotation detecting unit detects the detection signal exceeding the reference threshold voltage in at least the first segment and the second segment.

9. A stepping motor control circuit according to claim 7, wherein the control unit does not change the main drive pulse when the rotation detecting unit detects the detection signal exceeding the reference threshold voltage in all of the first segment, the second segment, and the third segment.

10. A stepping motor control circuit according to claim 7, wherein the control unit changes the main drive pulse to a main drive pulse having large energy when the rotation detecting unit detects the detection signal exceeding the reference threshold voltage only in the first segment and the third segment.

11. A stepping motor control circuit according to claim 7, wherein the control unit changes the main drive pulse to a main drive pulse having large energy when the rotation detecting unit detects the detection signal exceeding the reference threshold voltage only in the third segment.

12. A stepping motor control circuit according to claim 7, wherein the control unit changes the main drive pulse to a main drive pulse having small energy when the rotation detecting unit detects the detection signal exceeding the reference threshold voltage only in the second segment.

13. A stepping motor control circuit according to claim 12, wherein the control unit changes the main drive pulse to a main drive pulse having small energy when the rotation detecting unit detects the detection signal exceeding the reference threshold voltage once or consecutively by a predetermined number of times only in the second segment or only in the second segment and the third segment.

14. A stepping motor control circuit according to claim 7, wherein the control unit changes the main drive pulse to a main drive pulse having smaller energy when the rotation detecting unit detects the detection signal exceeding the reference threshold voltage only in the second segment and the third segment.

15. A stepping motor control circuit according to claim 7, wherein the control unit drives with the corrective drive pulse and then changes the main drive pulse to a main drive pulse having large energy when the rotation detecting unit does not detect the detection signal exceeding the predetermined reference threshold voltage in the second segment and the third segment.

16. A stepping motor control circuit according to claim 15, wherein the control unit drives with the corrective drive pulse and then changes the main drive pulse to a main drive pulse having small energy by a predetermined amount when the driven main drive pulse has maximum energy.

17. A stepping motor control circuit according to claim 15, wherein the control unit drives with the corrective drive pulse and then does not change the main drive pulse when the driven main drive pulse has maximum energy.

18. A stepping motor control circuit according to claim 1, wherein the detection segment is divided into the first segment immediately after the drive with the main drive pulse, the second segment after the first segment, the third segment after the second segment, and a fourth segment after the third segment.

19. A stepping motor control circuit according to claim 18, wherein the control unit changes the main drive pulse to a main drive pulse having large energy when the rotation detecting unit detects the detection signal exceeding the reference threshold voltage only in the second segment.

20. A stepping motor control circuit according to claim 18, wherein the control unit changes the main drive pulse to a main drive pulse having large energy without driving with the corrective drive pulse when the rotation detecting unit detects the detection signal exceeding the reference threshold voltage in the second segment and also in the third segment or in the fourth segment.

21. A stepping motor control circuit according to claim 18, wherein the control unit drives with the corrective drive pulse and then changes the main drive pulse to a main drive pulse having large energy when the rotation detecting unit detects the detection signal exceeding the reference threshold voltage in the second segment but not in any of the third segment and the fourth segment.

22. A stepping motor control circuit according to claim 21, wherein the control unit drives with the corrective drive pulse and then changes the main drive pulse to a main drive pulse having small energy by a predetermined amount when the driven main drive pulse has maximum energy.

23. A stepping motor control circuit according to claim 21, wherein the control unit drives with the corrective drive pulse and then does not change the main drive pulse when the driven main drive pulse has maximum energy.

24. A stepping motor control circuit according to claim 18, wherein the control unit does not change the main drive pulse when the rotation detecting unit does not detect the detection signal exceeding the reference threshold voltage in the second segment, but detects in the first segment and the third segment.

25. A stepping motor control circuit according to claim 18, wherein the control unit changes the main drive pulse to a main drive pulse having small energy when the rotation detecting unit does not detect the detection signal exceeding the reference threshold voltage in the first segment and the second segment, but detects in the third segment.

26. A stepping motor control circuit according to claim 18, wherein the control unit changes the main drive pulse to a main drive pulse having small energy when the rotation detecting unit detects the detection signal exceeding the reference threshold voltage once or consecutively by a predetermined number of times only in the third segment.

27. A stepping motor control circuit according to claim 18, wherein the control unit drives with the corrective drive pulse and then changes the main drive pulse to a main drive pulse having minimum energy when the driven main drive pulse has maximum energy.

28. An analogue electronic timepiece having a stepping motor configured to rotate time hands, and a stepping motor control circuit configured to control the stepping motor, wherein the stepping motor control circuit according to claim 1 is used as the stepping motor control circuit.

* * * * *